US011626128B2

(12) United States Patent
Terakawa et al.

(10) Patent No.: US 11,626,128 B2
(45) Date of Patent: Apr. 11, 2023

(54) MAGNETIC RECORDING MEDIUM

(71) Applicant: SONY GROUP CORPORATION, Tokyo (JP)

(72) Inventors: Masaru Terakawa, Tokyo (JP); Minoru Yamaga, Tokyo (JP)

(73) Assignee: Sony Group Corporation, Tokyo (JP)

(*) Notice: Subject to any disclaimer, the term of this patent is extended or adjusted under 35 U.S.C. 154(b) by 0 days.

(21) Appl. No.: 17/253,254

(22) PCT Filed: Oct. 31, 2019

(86) PCT No.: PCT/JP2019/042704
§ 371 (c)(1),
(2) Date: Dec. 17, 2020

(87) PCT Pub. No.: WO2021/065018
PCT Pub. Date: Apr. 8, 2021

(65) Prior Publication Data
US 2022/0328066 A1    Oct. 13, 2022

(30) Foreign Application Priority Data

Oct. 2, 2019 (JP) .............................. JP2019-182547

(51) Int. Cl.
*G11B 5/008* (2006.01)
*G11B 5/73* (2006.01)

(52) U.S. Cl.
CPC ...... *G11B 5/00813* (2013.01); *G11B 5/73911* (2019.05)

(58) Field of Classification Search
None
See application file for complete search history.

(56) References Cited

U.S. PATENT DOCUMENTS

| 5,545,462 | A  | * | 8/1996  | Goto    | G11B 5/70605 |
|-----------|----|---|---------|---------|--------------|
|           |    |   |         |         | 428/323      |
| 5,876,833 | A  | * | 3/1999  | Suzuki  | G11B 5/7021  |
|           |    |   |         |         | 428/425.9    |
| 6,663,955 | B2 | * | 12/2003 | Ejiri   | G11B 5/714   |
| 10,510,369| B2 | * | 12/2019 | Kaneko  | G11B 5/78    |
| 2005/0048324 | A1 | * | 3/2005 | Ejiri | G11B 5/7085  |
|           |    |   |         |         | 428/128      |
| 2020/0118589 | A1 | * | 4/2020 | Terakawa | G11B 5/70642 |
| 2022/0328066 | A1 | * | 10/2022 | Terakawa | G11B 5/00813 |

* cited by examiner

*Primary Examiner* — Peter Vincent Agustin
(74) *Attorney, Agent, or Firm* — K&L Gates LLP

(57) ABSTRACT

An object of the present disclosure is to provide a magnetic recording medium excellent in electro-magnetic conversion characteristic and thermal stability.

The present disclosure provides a tape-shaped magnetic recording medium including: a substrate; and a magnetic layer provided over the substrate and including a magnetic powder, in which the magnetic layer has an average thickness of equal to or less than 90 nm, the magnetic powder has an average aspect ratio of from 1.0 to 3.0, the magnetic powder has an average particle volume of equal to or less than 2,300 nm$^3$, a coercive force Hc1 in a vertical direction of the magnetic recording medium is equal to or less than 4,500 Oe, a coercive force Hc2 in a longitudinal direction of the magnetic recording medium and the coercive force Hc1 satisfy a relation of Hc2/Hc1≤0.8, and the ratio Hrp/Hc1 of a residual coercive force Hrp of the magnetic recording medium measured using a pulsed magnetic field and the coercive force Hc1 is equal to or less than 2.0.

17 Claims, 8 Drawing Sheets

MAGNETIC RECORDING MEDIUM

TECHNICAL FIELD

The present disclosure relates to a magnetic recording medium.

BACKGROUND ART

Attendant on the progress of, for example, IoT, big data and artificial intelligence and the like, an amount of data collected and stored has been increasing greatly. As a medium for recording a large amount of data, magnetic recording media are often used.

Concerning the magnetic recording medium, a variety of technologies have hitherto been proposed. For example, as a technology related to a magnetic powder included in a magnetic recording medium, PTL 1 described below discloses a magnetic recording medium in which at least a magnetic layer formed by applying a magnetic coating material containing a ferromagnetic powder and a binder is provided on a nonmagnetic support. In the magnetic recording medium, an aromatic compound having a carboxyl group and at least one hydroxyl group in its molecule, in which, when two or more aromatic rings are present they are in the form of a condensed ring, is contained in the magnetic layer in an amount of 0.4 to 10 [parts by weight] based on 100 [parts by weight] of the ferromagnetic powder.

CITATION LIST

Patent Literature

[PTL 1]
JP 2002-373413A

SUMMARY

Technical Problem

In order to enhance recording density on a magnetic recording medium, it may be contemplated to reduce the particle volume of the magnetic powder included in the magnetic recording medium. In addition, for enhancing electro-magnetic conversion characteristics, also, it may be considered to reduce the particle volume of the magnetic powder. As the particle volume of the magnetic powder becomes smaller, however, thermal stability of the magnetic recording medium is worsened.

In view of this, it is an object of the present disclosure to provide a magnetic recording medium that is excellent in thermal stability even in the case where the particle volume of the magnetic powder is small.

Solution to Problem

The present disclosure provides a tape-shaped magnetic recording medium including:
a substrate; and
a magnetic layer provided over the substrate and including a magnetic powder,
in which the magnetic layer has an average thickness of equal to or less than 90 nm,
the magnetic powder has an average aspect ratio of from 1.0 to 3.0,
the magnetic powder has an average particle volume of equal to or less than 2,300 $nm^3$,
a coercive force $Hc1$ in a vertical direction of the magnetic recording medium is equal to or less than 4,500 Oe,
a coercive force $Hc2$ in a longitudinal direction of the magnetic recording medium and the coercive force $Hc1$ satisfy a relation of $Hc2/Hc1 \leq 0.8$, and
a ratio $Hrp/Hc1$ of a residual coercive force $Hrp$ of the magnetic recording medium measured using a pulsed magnetic field and the coercive force $Hc1$ is equal to or less than 2.0.

The average particle volume of the magnetic powder may be equal to or less than 2,200 $nm^3$.

The ratio $Hrp/Hc1$ may be equal to or less than 1.95.
The ratio $Hrp/Hc1$ may be equal to or less than 1.90.
The ratio $Hrp/Hc1$ may be equal to or less than 1.85.
The magnetic powder may include hexagonal ferrite.
The hexagonal ferrite may contain at least one kind of metal selected from among Ba and Sr.
The coercive force $Hc2$ in the longitudinal direction of the magnetic recording medium may be equal to or less than 2,000 Oe.
The magnetic recording medium may have an average thickness of equal to or less than 5.6 μm.
The substrate may have an average thickness of equal to or less than 4.2 μm.
The average thickness of the magnetic layer may be equal to or less than 80 nm.
The coercive force $Hc2$ and the coercive force $Hc1$ may satisfy a relation of $Hc2/Hc1 \leq 0.7$.
The coercive force $Hc1$ may be equal to or more than 500 Oe.
The magnetic recording medium may have a ground layer provided between the magnetic layer and the substrate, and the ground layer may have an average thickness of equal to or less than 2.0 μm.
A back layer may be provided on a surface on a side opposite to a surface on a side on which the magnetic layer is provided, of two surfaces of the substrate, and the back layer may have an average thickness of equal to or less than 0.6 μm.
The average particle size of the magnetic powder may be equal to or less than 50 nm.

In addition, the present disclosure also provides a tape cartridge including:
the magnetic recording medium mentioned above;
a communication section that performs communication with a recording/reproduction apparatus;
a storage section; and
a control section that stores information received from the recording/reproduction apparatus through the communication section in the storage section, and, in response to demand from the recording/reproduction apparatus, reads the information out of the storage section and transmits the information to the recording/reproduction apparatus through the communication section,
in which the information includes adjustment information for adjusting a tension exerted in the longitudinal direction of the magnetic recording medium.

DESCRIPTION OF EMBODIMENTS

Figure 1:
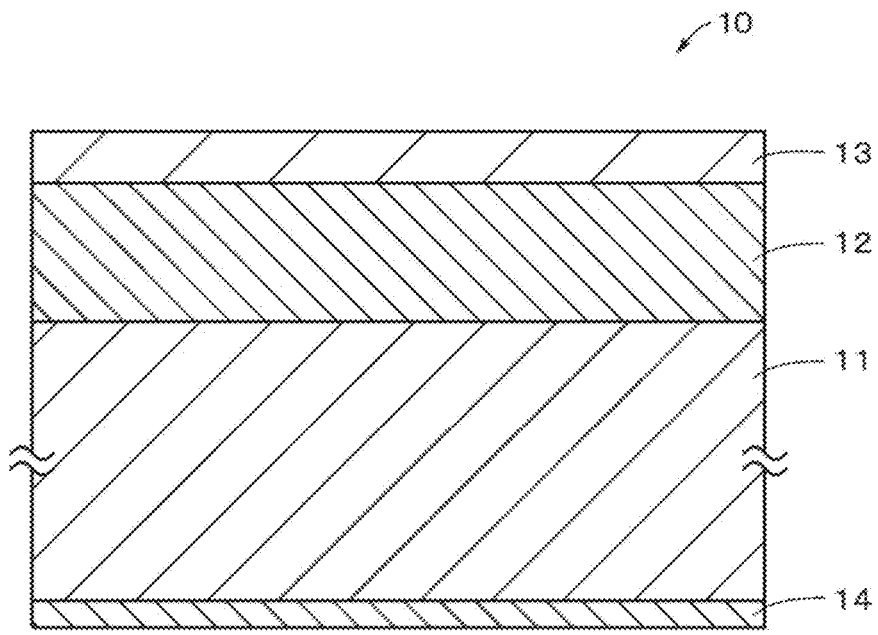
FIG. 1 is a sectional view of a magnetic recording medium according to one embodiment of the present disclosure.

Preferred embodiments for carrying out the present disclosure will be described below. Note that the embodiments described below are typical embodiments of the present disclosure, and the scope of the present disclosure is not limited only to these embodiments.

The present disclosure will be described in the following order.

1. Description of Present Disclosure
2. Embodiment (Example of Coating Type Magnetic Recording Medium)
   (1) Configuration of Magnetic Recording Medium
   (2) Method of Manufacturing Magnetic Recording Medium
   (3) Recording/Reproduction Apparatus
   (4) Cartridge
   (5) Effect
   (6) Modification
3. Examples 1. Description of Present Disclosure A magnetic recording medium of the present disclosure has a magnetic layer including a magnetic powder having a specific particle volume, and has a coercive force Hc1 in a vertical direction, a ratio Hc2/Hc1 of a coercive force Hc2 in a longitudinal direction and the coercive force Hc1, and a ratio Hrp/Hc1 of a residual coercive force Hrp measured using a pulsed magnetic field in respective specific numerical value ranges. With this configuration, the magnetic recording medium of the present disclosure is excellent in electro-magnetic conversion characteristic and excellent also in thermal stability. The thermal stability and residual coercive force Hrp will be described in detail below.

As the particle volume of the magnetic powder included in the magnetic recording medium is reduced, recording density is enhanced, and, further, electro-magnetic change characteristic can be enhanced. However, as the particle volume is reduced, magnetization recorded on the magnetic recording medium (specifically, the magnetic layer) becomes liable to be lost by thermal energy, which may cause attenuation of data signals. Thus, as the particle volume of the magnetic powder included in the magnetic recording medium is reduced, stability against heat (also referred to as thermal stability) of the magnetic recording medium may be lowered.

Thermal energy given to the magnetic recording medium from a storage environment during storage of the magnetic recording medium, in a short term, is considered not to exert a great influence on the magnetic recording medium. However, the storage is considered to extend for a long period of time, and in the case where the thermal energy is given to the magnetic recording medium for a long time in the storage environment, an unallowable influence may be exerted on the magnetic recording medium. Therefore, in order to minimize signal attenuation by the thermal energy, it is desirable that the thermal stability of the magnetic recording medium is higher.

Investigations of thermal stability of a magnetic recording medium by the present inventors has indicated that a magnetic recording medium having better thermal stability can be obtained by adjusting not only the conventionally known coercive forces in the vertical direction and the longitudinal direction but also other index. The other index is the above-mentioned residual coercive force Hrp.

Figure 13:
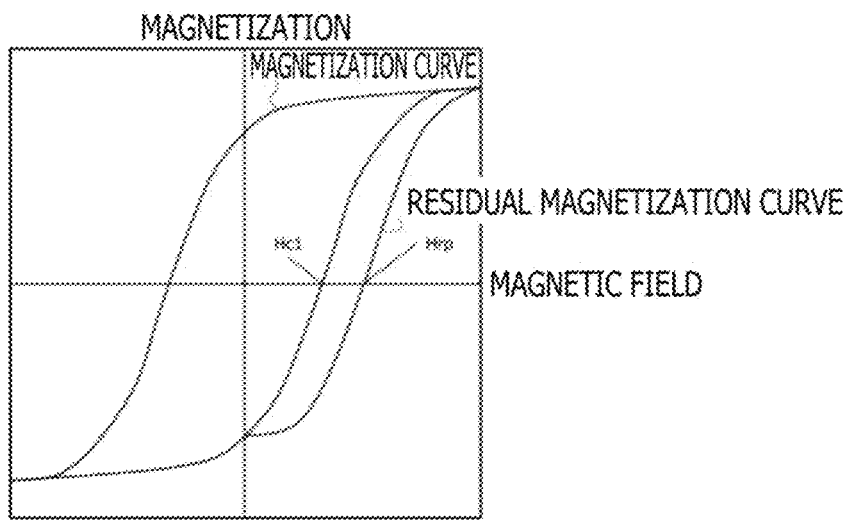
FIG. 13 is a diagram depicting an example of a magnetization curve and a residual magnetization curve.

The residual coercive force Hrp will be described below referring to FIG. 13.

The coercive force Hc1 in the vertical direction is a conventionally used index, and, for measurement thereof, an M-H loop (magnetization curve) is formed based on the results of measurement by a magnetometer, for example. An example of the M-H loop is depicted in FIG. 13. As illustrated in FIG. 13, the magnetic field at a position where the M-H loop crosses an X axis (magnetic field) is the coercive force Hc1. A magnetic field scanning speed used for the measurement is slow.

The residual coercive force Hrp newly found out by the present inventors as an index which can be utilized for enhancement of thermal stability is measured using a pulsed magnetic field, unlike the measurement of the coercive force Hc1. In other words, this measurement is conducted using a fast magnetic field scanning speed. In the measurement, a magnetization curve is formed based on magnetization quantity obtained using the pulsed magnetic field. The magnetization curve thus formed is called a residual magnetization curve. An example of the residual magnetization curve is also depicted in FIG. 13. A magnetic field at a point where this residual magnetization curve crosses the X axis (magnetic field) is denoted by "Hrp" in FIG. 13, and this magnetic field is the residual coercive force.

The present inventors have found out that with the difference between the coercive force Hc1 and the residual coercive force Hrp being small, more specifically, with the ratio Hrp/Hc1 of the residual coercive force Hrp and the coercive force Hc1 being within a specified numerical value range, thermal stability of the magnetic recording medium is enhanced.

Note that the measurement of the residual coercive force Hrp is performed using a fast magnetic field scanning speed, as described above. This fast magnetic field scanning speed is closer to the magnetic field applied in recording on the magnetic recording medium, as compared to the slow magnetic field scanning speed used in the measurement of the coercive force Hc1. From this point of view, also, the residual coercive force Hrp is considered to be a useful index.

The ratio Hrp/Hc1 of the residual coercive force Hrp and the coercive force Hc1, of the magnetic recording medium of the present disclosure, may be equal to or less than 2.0, preferably equal to or less than 1.95, more preferably equal to or less than 1.90, and further preferably equal to or less than 1.85. With the ratio Hrp/Hc1 being within the above-mentioned numerical value range, the magnetic recording medium of the present disclosure has excellent thermal stability, whereby it is possible to prevent signal attenuation at the time of long-time storage, for example.

Further, the average particle volume of the magnetic powder included in the magnetic recording medium of the present disclosure may be equal to or less than 2,300 nm$^3$, preferably equal to or less than 2,200 nm$^3$, more preferably equal to or less than 2,100 nm$^3$, and further preferably equal to or less than 2,000 nm$^3$. With the average particle volume being within the above-mentioned numerical value range, electro-magnetic conversion characteristic is enhanced. Notwithstanding the average particle volume of the magnetic powder included in the magnetic recording medium of the present disclosure is thus very small, the magnetic recording medium of the present disclosure is excellent in thermal stability as described above. While it is difficult to secure both electro-magnetic conversion characteristic and thermal stability, both the electro-magnetic conversion characteristic and thermal stability can be enhanced by the present disclosure.

The magnetic recording medium of the present disclosure includes a substrate, and a magnetic layer which is provided on the substrate and includes a magnetic powder, with magnetic powder having an average thickness of equal to or less than 90 nm, and with the magnetic powder having an average aspect ratio of from 1.0 to 3.0. By these points, electro-magnetic conversion characteristic is enhanced.

The magnetic recording medium of the present disclosure further has a coercive force Hc1 of equal to or less than 4,500 Oe, and a coercive force Hc2 in the longitudinal direction of the magnetic recording medium and the coercive force Hc1 satisfy a relation of Hc2/Hc1≤0.8. By these points, also, electro-magnetic conversion characteristic is enhanced.

The magnetic recording medium of the present disclosure may preferably have an average thickness $t_T$ of equal to or less than 5.6 µm, more preferably equal to or less than 5.3 µm, and further preferably equal to or less than 5.2 µm, equal to or less than 5.0 µm, or equal to or less than 4.6 µm. The magnetic recording medium of the present disclosure may thus have a small overall thickness. With the overall thickness of the magnetic recording medium of the present disclosure thus set small, it is possible, for example, to make larger the length of the tape taken up into one magnetic recording cartridge, whereby recording capacity per magnetic recording cartridge can be enhanced. Thus, the present disclosure can enhance recording capacity, in addition to enhancement of electro-magnetic conversion characteristic and thermal stability.

The magnetic recording medium according to the present disclosure may have a width of, for example, 5 to 30 mm, particularly 7 to 25 mm, more particularly 10 to 20 mm, and further particularly 11 to 19 mm. The tape-shaped magnetic recording medium according to the present disclosure may have a length of, for example, 500 to 1,500 m. For example, according to LTO8 standard, the tape width is 12.65 mm, and the tape length is 960 m.

The magnetic recording medium according to the present disclosure is tape-shaped, and may be, for example, a long magnetic recording tape. The tape-shaped magnetic recording medium according to the present disclosure may be accommodated in a magnetic recording cartridge, for example. More specifically, the tape-shaped magnetic recording medium of the present disclosure may be accommodated in the magnetic recording cartridge in the state of being wound around a reel in the cartridge.

In one preferred embodiment of the present disclosure, the magnetic recording medium of the present disclosure may include a magnetic layer, a ground layer, a substrate (also called base layer), and a back layer. These four layers may be stacked in this order. The magnetic recording medium according to the present disclosure may include other layers in addition to these layers. The other layers may be selected, as required, according to the kind of the magnetic recording medium. The magnetic recording medium according to the present disclosure may be, for example, a coating type magnetic recording medium. The coating type magnetic recording medium will be described in more detail in the following section 2.

2. Embodiment (Example of Coating Type Magnetic Recording Medium)

(1) Configuration of Magnetic Recording Medium

First, referring to FIG. 1, the configuration of a magnetic recording medium 10 according to one embodiment will be described. The magnetic recording medium 10 includes a long substrate 11, a ground layer 12 provided on a major surface on one side of the substrate 11, a magnetic layer 13 provided on the ground layer 12, and a back layer 14 provided on a major surface on the other side of the substrate 11. Note that the ground layer 12 and the back layer 14 are provided according to necessity, and may not be provided.

The magnetic recording medium 10 has a long tape-like shape, and is made to travel in the longitudinal direction at the time of recording or reproduction. Note that the surface of the magnetic layer 13 is a surface on which a magnetic head runs. The magnetic recording medium 10 is preferably used on a recording/reproduction apparatus that includes a ring-type head as a recording head. Note that the "vertical direction" herein means a direction perpendicular to the surface of the magnetic recording medium 10 (the thickness direction of the magnetic recording medium 10), and the "longitudinal direction" is the longitudinal direction (traveling direction) of the magnetic recording medium 10.

(Substrate)

The substrate 11 is a nonmagnetic support that supports the ground layer 12 and the magnetic layer 13. The substrate 11 has a long film-like shape. The substrate 11 has an average thickness of preferably equal to or less than 4.2 µm, more preferably equal to or less than 3.8 µm, and further preferably equal to or less than 3.4 µm. When the average thickness of the substrate 11 is equal to or less than 4.2 µm, recording capacity that can be recorded on one data cartridge can be enhanced as compared to a general magnetic recording medium. The average thickness of the substrate 11 is preferably equal to or more than 3 µm, more preferably equal to or more than 3.2 µm. When the average thickness of the substrate 11 is equal to or more than 3 µm, strength of the substrate 11 can be restrained from being lowered.

The average thickness of the substrate 11 is obtained in the manner as follows. First, the magnetic recording medium 10 with a width of ½ inch is prepared, and is cut to a length of 250 mm, to produce a sample. Subsequently, other layers than the substrate 11 of the sample (namely, the ground layer 12, the magnetic layer 13 and the back layer 14) are removed by a solvent such as MEK (methyl ethyl ketone) or diluted hydrochloric acid. Next, using a laser hologage (LGH-110C) produced by Mitutoyo Corporation as a measuring instrument, the thickness of the sample (substrate 11) is measured at five points, and the measurement values are simply averaged (arithmetic mean), to calculate the average thickness of the substrate 11. Note that the measurement positions are selected at random from the sample.

The substrate 11 includes at least one kind of material selected from among, for example, polyesters, polyolefins, cellulose derivatives, vinyl resins and other polymer resins. In the case where the substrate 11 includes two or more kinds of materials among the above-mentioned materials, the two or more kinds of materials may be mixed or may be copolymerized or may be laminated.

The polyesters include at least one kind of material selected from among, for example, PET (polyethylene terephthalate), PEN (polyethylene naphthalate), PBT (polybutylene terephthalate), PBN (polybutylene naphthalate), PCT (polycyclohexylene dimethylene terephthalate), PEB (polyethylene-p-oxybenzoate) and polyethylene bisphenoxycarboxylate.

The polyolefins include at least one kind of material selected from among, for example, PE (polyethylene) and PP (polypropylene). The cellulose derivatives include at least one kind of material selected from among, for example, cellulose diacetate, cellulose triacetate, CAB (cellulose acetate butyrate) and CAP (cellulose acetate propionate). The vinyl resins include at least one kind of material selected from among, for example, PVC (polyvinyl chloride) and PVDC (polyvinylidene chloride).

The other polymer resins include at least one kind of material selected from among, for example, PA (polyamides, nylons), aromatic PA (aromatic polyamides, aramids), PI (polyimides), aromatic PI (aromatic polyimides), PAI (polyamide-imide), aromatic PAI (aromatic polyamide-imide), PBO (polybenzoxazole, e.g., Zylon (registered trademark)), polyether, PEK (polyether ketone), polyether ester, PES (polyether sulfone), PEI (polyether imide), PSF (polysulfone), PPS (polyphenylene sulfide), PC (polycarbonate), PAR (polyarylate) and PU (polyurethane).

(Magnetic Layer)

The magnetic layer 13 is a recording layer for recording signals. The magnetic layer 13 includes, for example, a magnetic powder and a binder. The magnetic layer 13 may further include at least one kind of additive selected from among a lubricant, an antistatic agent, an abrasive, a curing agent, a rust-preventive agent, nonmagnetic reinforcement particles, etc., as required.

Figure 2:
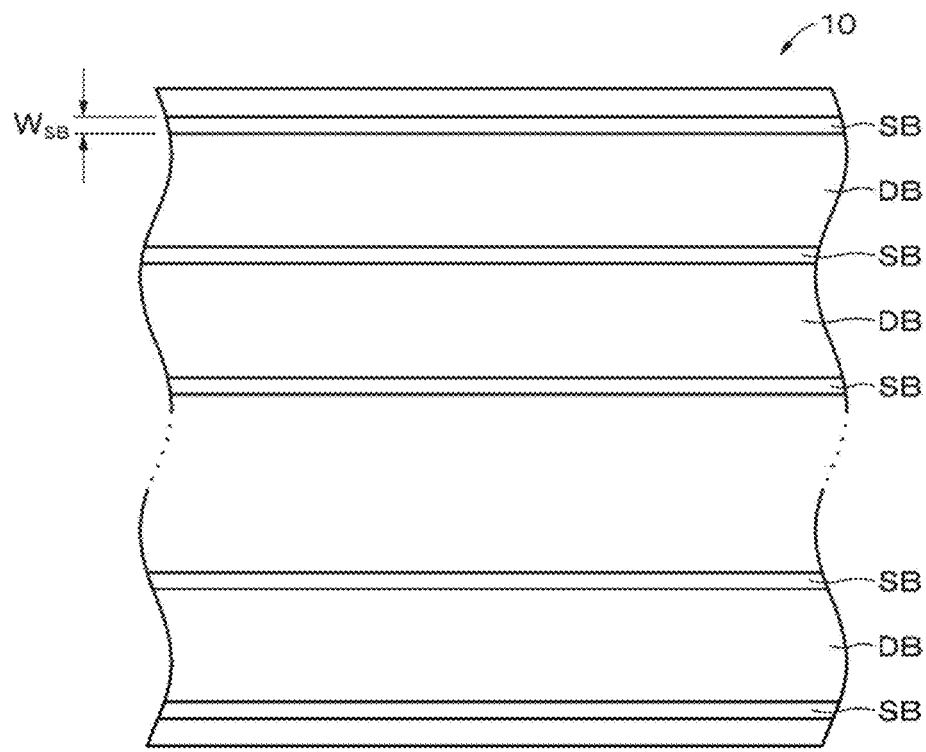
FIG. 2A is a schematic diagram of layout of a data band and a servo band.
FIG. 2B is an enlarged view of the data band.
Figure 2:
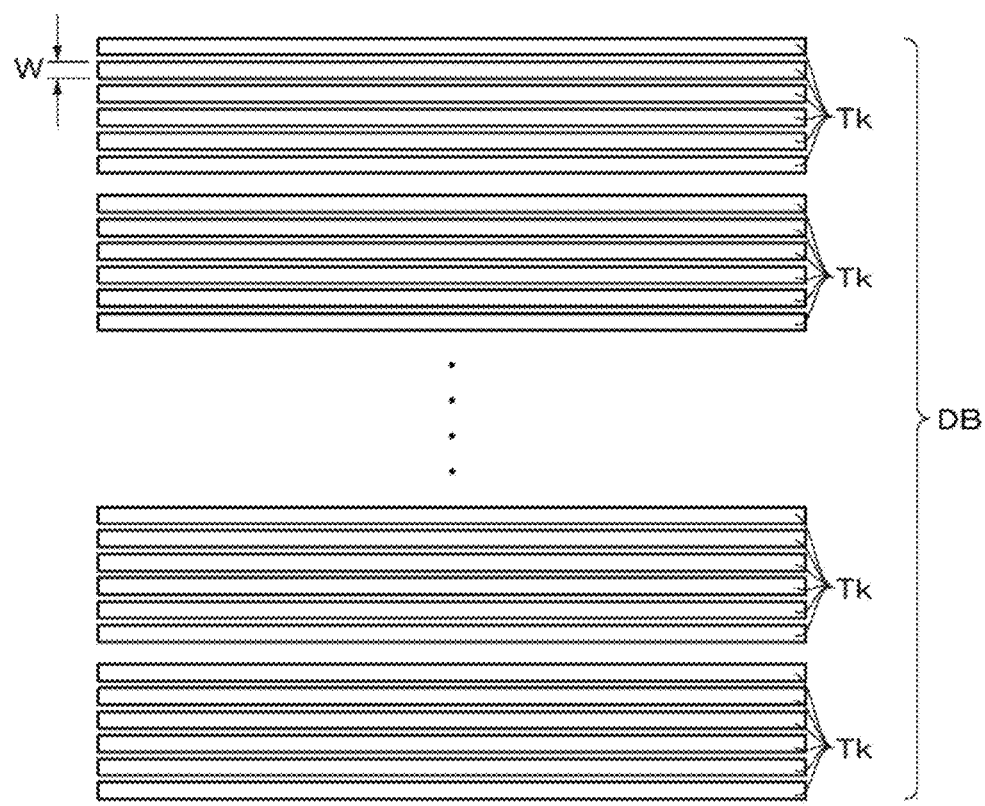

As depicted in FIG. 2A, it is preferable that the magnetic layer 13 preliminarily has a plurality of servo bands SB and a plurality of data bands DB. The plurality of servo bands SB is provided at regular intervals in the width direction of the magnetic recording medium 10. The data band DB is provided between the adjacent servo bands SB. In the servo bands SB, servo signals for tracking control of a magnetic head are preliminarily written. User data are recorded in the data bands DB.

The ratio $R_S$ (=($S_{SB}$/S)×100) of the total area $S_{SB}$ of the servo bands SB to the area S of the surface of the magnetic layer 13 is preferably equal to or less than 4.0%, more preferably equal to or less than 3.0%, and further preferably equal to or less than 2.0%, from the viewpoint of securing a high recording capacity. On the other hand, the ratio $R_S$ of the total area $S_{SB}$ of the servo bands SB to the area S of the surface of the magnetic layer 13 is preferably equal to or more than 0.8%, from the viewpoint of securing five or more servo tracks.

The ratio $R_S$ of the total area $S_{SB}$ of the servo bands SB to the area S of the surface of the magnetic layer 13 is obtained as follows. For example, the magnetic recording medium 10 is developed using a ferri-colloid developer (Sigmarker Q, produced by Sigma Hi-Chemical), then the developed magnetic recording medium 10 is observed under an optical microscope, to measure the servo band width $W_{SB}$ and the number of the servo bands SB. Next, the ratio $R_S$ is obtained from the following formula.

Ratio $R_S$ [%]=((servo band width $W_{SB}$)×(number of servo bands))/(width of magnetic recording medium 10))×100

The number of the servo bands SB is preferably equal to or more than 5, more preferably equal to or more than 5+4n (where n is a positive integer), and further preferably equal to or more than 9+4n. When the number of the servo band SB is equal to or more than 5, influence of size variations in the width direction of the magnetic recording medium 10 on servo signals can be restrained, and stable recording/reproduction characteristics with less off tracks can be secured. The number of the servo bands SB is not particularly limited, and is, for example, equal to or less than 33.

The number of the servo bands SB can be confirmed as follows. First, the surface of the magnetic layer 13 is observed under a magnetic force microscope (MFM), to obtain an MFM image. Next, the number of servo bands SB is counted using the MFM image.

The servo band width $W_{SB}$ is preferably equal to or less than 95 μm, more preferably equal to or less than 60 μm, and further preferably equal to or less than 30 μm, from the viewpoint of securing a high recording capacity. The servo band width $W_{SB}$ is preferably equal to or more than 10 μm. Manufacture of a recording head capable of reading servo signals with a servo band width $W_{SB}$ of less than 10 μm may involve difficulty.

The width of the servo band width $W_{SB}$ is obtained as follows. First, the surface of the magnetic layer 13 is observed using a magnetic force microscope (MFM), to obtain an MFM image. Next, the width of the servo band width $W_{SB}$ is measured by use of the MFM image.

As illustrated in FIG. 2B, the magnetic layer 13 is configured such that the data band DB can be formed with a plurality of data tracks Tk. The data track width W is preferably equal to or less than 2.0 μm, more preferably equal to or less than 1.5 μm, and further preferably equal to or less than 1.0 μm, from the viewpoint of securing a high recording capacity. The data track width W is preferably equal to or more than 0.02 μm.

The data track width W is obtained as follows. For example, data record patterns in data band portions of the magnetic layer 13 recorded with data over the whole surface are observed by use of a magnetic force microscope (MFM), to obtain an MFM image. As the MFM, Dimension 3100 produced by Digital Instruments, Inc. and an analysis software therefor. The measurement region for the MFM image is 10 μm×10 μm, and the measurement region of 10 μm×10 μm is divided into 512×512 (=262,144) measurement points. Measurement by MFM is conducted for three 10 μm×10 μm measurement regions at different locations, and, thus, three MFM images are obtained. From the three MFM images thus obtained, track width is measured at 10 locations, using the analysis software attached to Dimension 3100, and an average (simple mean) is obtained. The average is the data track width W. Note that measurement conditions for the MFM are scanning speed: 1 Hz, chip used: MFMR-20, lift height: 20 nm, and correction: Flatten order 3.

The magnetic layer 13 is configured to be able to record data, such that the minimum value L of a distance between magnetization reversals and the data track width W preferably satisfy W/L≤200, more preferably W/L≤60, further preferably W/L≤45, and particularly preferably W/L≤30. Where the minimum value L of the distance between magnetization reversals is constant and the minimum value L of the distance between magnetization reversals and the track width W satisfy W/L>200 (in other words, where the track width W is large), track recording density is not raised, so that it may be impossible to sufficiently secure recording capacity. In addition, where the track width W is constant and the minimum value L of the distance between magnetization reversals and the track width W satisfy W/L>200 (in other words, where the minimum vale L of the distance between magnetization reversals is small), bit length is reduced, and linear recording density is raised, but SNR may be worsened due to an influence of spacing loss. Therefore, in order to restrain worsening of SNR while securing recording capacity, it is preferable that W/L is in the range of W/L≤60 as described above. It is to be noted, however, that W/L is not limited to within the above-mentioned range, and W/L≤23 or W/L≤13 may be adopted. A lower limit for W/L is not particularly limited, but, for example, 1≤W/L.

The magnetic layer 13 is configured to be able to record data such that the minimum value L of the distance between magnetization reversals is preferably equal to or less than 55 nm, more preferably equal to or less than 53 nm, further preferably equal to or less than 52 nm, equal to or less than 50 nm, equal to or less than 48 nm, equal to or less than 44 nm, and particularly preferably equal to or less than 40 nm, from the viewpoint of securing a high recording capacity. The lower limit for the minimum value L of the distance between magnetization reversals is preferably equal to or more than 20 nm, taking magnetic particle size into consideration. The minimum value L of the distance between magnetization reversals is considered according to the magnetic particle size.

The minimum value L of the distance between magnetization reversals is obtained as follows. For example, a data record pattern in data band portions of the magnetic layer 13 recorded with data over the whole surface is observed using a magnetic force microscope (MFM), to obtain an MFM image. As the MFM, Dimension 3100 produced by Digital Instruments, Inc. and an analysis software therefor are used. The measurement region for the MFM image is 2 μm×2 μm, and the 2 μm×2 μm measurement region is divided into 512×512 (=262,144) measurement points. The measurement by MFM is conducted for three 2 μm×2 μm measurement regions at different locations, and, thus, three MFM images are obtained. From two-dimensional rugged charts of record patterns of the MFM images thus obtained, the distance between bits is measured at 50 locations. The measurement of the distance between bits is conducted using the analysis software attached to Dimension 3100. A value approximately equal to the greatest common divisor of the measured 50 distances between bits is made to be the minimum value L of the distance between magnetization reversals. Note that measurement conditions are scanning speed: 1 Hz, chip used: MFMR-20, lift height: 20 nm, and correction: Flatten order 3.

The average thickness of the magnetic layer 13 is preferably equal to or less than 90 nm, particularly preferably equal to or less than 80 nm, more preferably equal to or less than 70 nm, and further preferably equal to or less than 50 nm. When the average thickness of the magnetic layer 13 is equal to or less than 90 nm, magnetization can be uniformly recorded in the thickness direction of the magnetic layer 13, in the case where a ring-type head is used as the recording head, so that electro-magnetic conversion characteristics (for example, C/N (Carrier to Noise Ratio)) can be enhanced.

The average thickness of the magnetic layer 13 is preferably equal to or more than 30 nm, and more preferably equal to or more than 35 nm. When the average thickness of the magnetic layer 13 is equal to or more than 30 nm, an output can be secured, in the case where an MR-type head is used as a reproduction head, so that electro-magnetic conversion characteristics (for example, C/N) can be enhanced.

The average thickness of the magnetic layer 13 is obtained, for example, as follows.

The magnetic recording medium 10 is subjected to slicing by processing by an FIB (Focused Ion Beam) method or the like. In the case of using the FIB method, as a pretreatment for observation of a TEM image of a section which will be described later, a carbon film and a tungsten thin film are formed as protective films. The carbon film is formed on the magnetic layer side surface and the back layer side surface of the magnetic recording medium 10 by a vapor deposition method, and the tungsten thin film is formed further over the magnetic layer side surface by a vapor deposition method or a sputtering method. The slicing is conducted along the lengthwise direction (longitudinal direction) of the magnetic recording medium 10. In other words, by the slicing, a section parallel to both the longitudinal direction and the thickness direction of the magnetic recording medium 10 is formed.

The section of the sliced sample thus obtained is observed by a transmission electron microscope (TEM) under the following conditions, to obtain a TEM image. Note that the magnification and acceleration voltage may be adjusted, as required, according to the kind of apparatus.

Apparatus: TEM (H9000NAR, produced by Hitachi, Ltd.)
Acceleration voltage: 300 kV
Magnification: 100,000

Next, using the TEM image thus obtained, the thickness of the magnetic layer 13 is measured at at least 10 positions in the longitudinal direction of the magnetic recording medium 10. The average value obtained by simply averaging (arithmetic mean) the measurement values thus obtained is adopted as the average thickness [nm] of the magnetic layer 13. Note that the positions where to perform the measurement are selected at random from the specimen.

(Magnetic Powder)

Examples of magnetic particles constituting the magnetic powder contained in the magnetic layer 13 include hexagonal ferrite, epsilon-type iron oxide (ε iron oxide), Co-containing spinel ferrite, gamma hematite, magnetite, chromium dioxide, cobalt-coated iron oxide, and metal, but these are not limitative. The magnetic powder may be one kind of material selected from among these, or may be a combination of two or more materials selected from among these. Preferably, the magnetic powder may include hexagonal ferrite, ε iron oxide, or Co-containing spinel ferrite. Particularly preferably, the magnetic powder is hexagonal ferrite. Particularly preferably, the hexagonal ferrite may include at least one material selected from among Ba and Sr. Particularly preferably, the ε iron oxide may include at least one material selected from among Al and Ga. These magnetic particles may be selected, as required, by a person skilled in the art based on such factors as the method of manufacturing the magnetic layer 13, standards of the tape, and the function of the tape.

The shape of the magnetic powder depends on the crystal structure of the magnetic powder. For example, barium ferrite (BaFe) and strontium ferrite may be hexagonal plate-like in shape. The ε iron oxide may be spherical. Cobalt ferrite may be cubic. The metal may be spindle-like in shape. In the manufacturing process of the magnetic recording medium 10, these magnetic particles are oriented.

The average particle size of the magnetic powder may be preferably equal to or less than 50 nm, more preferably equal to or less than 40 nm, further preferably equal to or less than 30 nm, equal to or less than 25 nm, equal to or less than 22 nm, equal to or less than 21 nm, or equal to or less than 20 nm. The average particle size may be, for example, equal to or more than 10 nm, preferably equal to or more than 12 nm.

The average aspect ratio of the magnetic powder may be preferably from 1.0 to 3.0, more preferably from 1.0 to 2.9.

(Embodiment in which Magnetic Powder Includes Hexagonal Ferrite)

According to a preferred embodiment of the present disclosure, the magnetic powder includes hexagonal ferrite, more particularly may include a powder of hexagonal ferrite-containing nano particles (hereinafter referred to as "hexagonal ferrite particles"). The hexagonal ferrite particles are, for example, hexagonal plate-like or substantially hexagonal plate-like in shape. The hexagonal ferrite may preferably contain at least one kind of metal selected from among Ba, Sr, Pb and Ca, and more preferably may contain at least one kind of metal selected from among Ba and Sr. The hexagonal ferrite may specifically be, for example, barium ferrite or strontium ferrite. The barium ferrite may further contain at least one kind of metal selected from among Sr, Pb and Ca, other than Ba. The strontium ferrite may further contain at least one kind of metal selected from among Ba, Pb and Ca, other than Sr.

More specifically, the hexagonal ferrite may have an average composition which can be represented by the general formula $MFe_{12}O_{19}$. Here, M is, for example, at least one kind of metal selected from among Ba, Sr, Pb and Ca, preferably at least one kind of metal selected from among Ba and Sr. M may be a combination of Ba with at least one kind of metal selected from among Sr, Pb and Ca. In addition, M may be a combination of Sr with at least one kind of metal selected from among Ba, Pb and Ca. In the above general formula, part of Fe may be replaced by other metallic element.

In the case where the magnetic powder includes a powder of hexagonal ferrite particles, the average particle size of the magnetic powder may be preferably equal to or less than 50 nm, more preferably equal to or less than 40 nm, further preferably equal to or less than 30 nm, equal to or less than 25 nm, equal to or less than 22 nm, equal to or less than 21 nm, or equal to or less than 20 nm. The average particle size may be, for example, equal to or more than 10 nm, preferably equal to or more than 12 nm, and more preferably equal to or more than 15 nm. For example, the average particle size of the magnetic powder may be 10 to 50 nm, 10 to 40 nm, 12 to 30 nm, 12 to 25 nm, or 15 to 22 nm. In the case where the average particle size of the magnetic powder is equal to or less than the above-mentioned upper limit (for example, equal to or less than 50 nm, particularly equal to or less than 30 nm), good electro-magnetic conversion characteristics (for example, SNR) can be obtained in the magnetic recording medium 10 for high recording density. In the case where the average particle size of the magnetic powder is equal to or more than the above-mentioned lower limit (for example, equal to or more than 10 nm, preferably equal to or more than 12 nm), dispersibility of the magnetic powder is more enhanced, and better electro-magnetic conversion characteristics (for example, SNR) can be obtained.

In the case where the magnetic powder includes a powder of hexagonal ferrite particles, the average aspect ratio of the magnetic powder may be preferably from 1.0 to 3.0, more preferably from 1.0 to 2.9, and further preferably from 2.0 to 2.9. With the average aspect ratio of the magnetic powder set in the above-mentioned numerical value range, aggregation of the magnetic powder can be restrained, and, further, resistance exerted on the magnetic powder at the time of perpendicularly orienting the magnetic powder in a step of forming the magnetic layer 13 can be restrained. This can lead to enhanced perpendicular orientability of the magnetic powder.

In the case where the magnetic powder includes the powder of hexagonal ferrite powder, the average particle size and the average aspect ratio of the magnetic powder are obtained as follows.

First, the magnetic recording medium 10 as a measurement object is subjected to slicing by processing by an FIB (Focused Ion Beam) method or the like. In the case of using the FIB method, as a pretreatment for observation of a TEM image of a section which will be described later, a carbon film and a tungsten thin film are formed as protective films. The carbon film is formed on the magnetic layer side surface and the back layer side surface of the magnetic recording medium 10 by a vapor deposition method, and the tungsten thin film is further formed over the magnetic layer side surface by a vapor deposition method or a sputtering method. The slicing is conducted along the lengthwise direction (longitudinal direction) of the magnetic recording medium 10. In other words, by the slicing, a section parallel to both the longitudinal direction and the thickness direction of the magnetic recording medium 10 is formed.

The section of the sliced sample thus obtained is subjected to section observation by use of a transmission electron microscope (H-9500, produced by Hitachi High-Technologies Corporation) under the conditions of an acceleration voltage of 200 kV and a total magnification of 500,000 such that the whole body of the magnetic layer 13 is included in the thickness direction of the magnetic layer 13, to pick up a TEM photograph.

Figure 3:
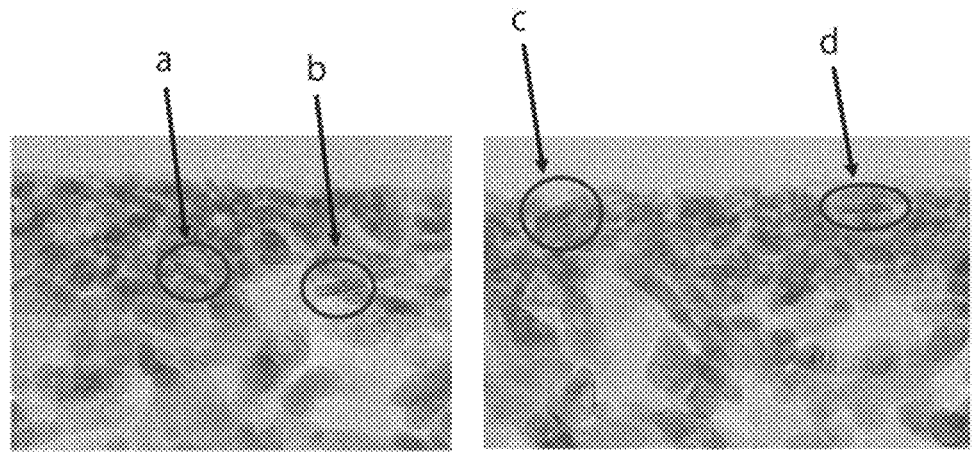
FIG. 3 is an example of TEM photograph of a magnetic layer.

Next, from the TEM photograph thus picked up, 50 particles are selected which have side surfaces oriented in the direction of the observation surface and of which the thickness can be clearly confirmed. For example, FIG. 3 depicts an example of the TEM photograph. In FIG. 3, for example, the particles denoted by a and d are selected, since their thicknesses can be clearly confirmed. For the 50 particles selected, their respective maximum plate thicknesses DA are measured. The maximum plate thicknesses DA obtained in this way are simply averaged (arithmetic mean), to obtain an average maximum plate thickness $DA_{ave}$.

Subsequently, the plate diameter DB of the magnetic powder is measured. For measurement of the plate diameter DB of the particles, from the TEM photograph picked up, 50 particles are selected of which the plate diameters can be clearly confirmed. For example, in FIG. 3, the particles denoted by b and c are selected, since their plate diameters can be clearly confirmed. For the 50 particles thus selected, their respective plate diameters DB are measured. The plate diameters DB obtained in this way are simply averaged (arithmetic mean), to obtain an average plate diameter $DB_{ave}$. The average plate diameter $DB_{ave}$ is the average particle size.

Then, from the average maximum plate thickness $DA_{ave}$ and the average plate diameter $DB_{ave}$, an average aspect ratio ($DB_{ave}/DA_{ave}$) of the particles is obtained.

In the case where the magnetic powder includes the powder of hexagonal ferrite particles, the average particle volume of the magnetic powder may be preferably equal to or less than 2,300 nm³, more preferably equal to or less than 2,200 nm³, further preferably equal to or less than 2,100 nm³, and particularly preferably equal to or less than 2,000 nm³. The average particle volume of the magnetic powder may be preferably equal to or more than 500 nm³, more preferably equal to or more than 700 nm³, and further preferably equal to or more than 1,000 nm³.

In the case where the average particle volume of the magnetic powder is equal to or less than the above-mentioned upper limit (for example, equal to or less than 2,300 nm³), good electro-magnetic conversion characteristics (for example, SNR) can be obtained, in the magnetic recording medium 10 for high recording density. In the case where the average particle volume of the magnetic powder is equal to or more than the above-mentioned lower limit (for example, equal to or more than 500 nm³), dispersibility of the magnetic powder is more enhanced, and better electro-magnetic conversion characteristics (for example, SNR) can be obtained.

The average particle volume of the magnetic powder is obtained as follows. First, as has been described above with respect to the method of calculating the average particle size of the magnetic powder described above, the average maximum plate thickness $DA_{ave}$ and the average plate diameter $DB_{ave}$ are obtained. Next, the average volume V of the magnetic powder is obtained by the following formula.

$$V = \frac{3\sqrt{3}}{8} \times DA_{ave} \times DB_{ave} \times DB_{ave} \quad \text{[Math. 1]}$$

According to a particularly preferred embodiment of the present disclosure, the magnetic powder is a barium ferrite magnetic powder or a strontium ferrite magnetic powder, and may be more preferably the barium ferrite magnetic powder. The barium ferrite magnetic powder includes iron oxide magnetic particles containing barium ferrite as a main phase (hereinafter referred to as "barium ferrite particles"). The barium ferrite magnetic powder is high in reliability of data recording, for example, the powder is not lowered in coercivity even in a high-temperature high-humidity environment. From such a point of view, the barium ferrite magnetic powder is preferred as the magnetic powder.

The average particle size of the barium ferrite magnetic powder is equal to or less than 50 nm, preferably from 10 to 40 nm, and more preferably from 12 to 25 nm.

In the case where the magnetic layer 13 contains a barium ferrite magnetic powder as a magnetic powder, the average thickness $t_m$ [nm] of the magnetic layer 13 is preferably equal to or less than 90 nm, and more preferably equal to or less than 80 nm. For example, the average thickness $t_m$ of the magnetic layer 13 may be 35 nm≤$t_m$≤90 nm.

In addition, a coercive force Hc measured in the thickness direction (perpendicular direction) of the magnetic recording medium 10 is preferably 160 to 280 kA/m, more preferably 165 to 275 kA/m, and further preferably 170 to 270 kA/m.

(Embodiment in which Magnetic Powder Includes ε Iron Oxide)

According to another preferred embodiment of the present disclosure, the magnetic powder may preferably include a powder of nano particles containing ε iron oxide (hereinafter referred to as "ε iron oxide particles"). The ε iron oxide particles can obtain a high coercive force, although they are fine particles. The ε iron oxide contained in the ε iron oxide particles is preferably crystal oriented preferentially in the thickness direction (perpendicular direction) of the magnetic recording medium 10.

The ε iron oxide particles are spherical or substantially spherical in shape, or are cubic or substantially cubit in shape. Since the ε iron oxide particles have the above-mentioned shape, in the case where the ε iron oxide particles are used as the magnetic particles, contact area between the particles in the thickness direction of the medium is reduced, and aggregation of the particles can be restrained, as compared to the case where hexagonal plate-like barium ferrite particles are used as the magnetic particles. Therefore, dispersibility of the magnetic powder can be enhanced, and a better SNR (Signal-to-Noise Ratio) can be obtained.

Figure 4:
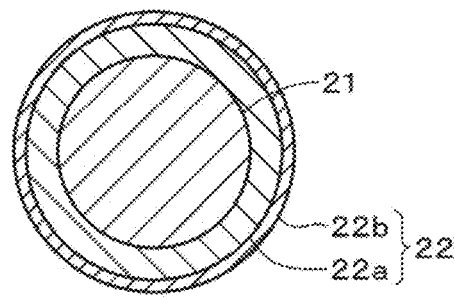
FIG. 4 is a sectional view depicting the configuration of a magnetic particle.

The ε iron oxide particles may have a core-shell type structure. Specifically, as depicted in FIG. 4, the ε iron oxide particles have a core part 21, and a shell part 22 of a two-layer structure provided in the periphery of the core part 21. The shell part 22 of the two-layer structure includes a first shell part 22a provided on the core part 21, and a second shell part 22b provided on the first shell part 22a.

The core part 21 contains ε iron oxide. The ε iron oxide contained in the core part 21 preferably includes an ε-$Fe_2O_3$ crystal as a main phase, and preferably includes a single-phase ε-$Fe_2O_3$.

The first shell part 22a covers at least part of the periphery of the core part 21. Specifically, the first shell part 22a may cover partly the periphery of the core part 21, or may cover wholly the periphery of the core part 21. From the viewpoint of making sufficient the exchange coupling of the core part 21 and the first shell part 22a and enhancing magnetic characteristics, the first shell part 22a preferably covers the entire surface of the core part 21.

The first shell part 22a is a so-called soft magnetic layer, and may include a soft magnetic material such as, for example, α-Fe, a Ni—Fe alloy or a Fe—Si—Al alloy. The α-Fe is obtained by reducing the ε iron oxide contained in the core part 21.

The second shell part 22b is an oxide coating as an oxidation preventive layer. The second shell part 22b may include a iron oxide, aluminum oxide, or silicon oxide. The α iron oxide may include at least one kind of iron oxide selected from among, for example, $Fe_3O_4$, $Fe_2O_3$ and FeO. In the case where the first shell part 22a includes α-Fe (soft magnetic material), the α iron oxide may be obtained by oxidizing the α-Fe included in the first shell part 22a.

With the ε iron oxide particles having the first shell part 22a as described above, thermal stability can be secured, and/or the coercive force Hc of the ε iron oxide particles (core-shell particles) as a whole can be adjusted to a coercive force Hc suitable for recording, while maintaining the coercive force Hc of the core part 21 alone at a high value. In addition, with the ε iron oxide particles having the second shell part 22b as described above, it is possible to restrain a situation in which the ε iron oxide particles are exposed to air, in and before the manufacturing process of the magnetic recording medium 10, with the result of generation of rust or the like on the particle surfaces, whereby characteristics of the ε iron oxide particles are lowered. Accordingly, degradation of characteristics of the magnetic recording medium 10 can be restrained.

Figure 5:
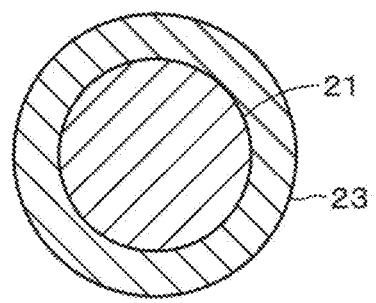
FIG. 5 is a sectional view depicting the configuration of a magnetic particle in a modification.

As illustrated in FIG. 5, the ε iron oxide particles may have a shell part 23 of a monolayer structure. In this case, the shell part 23 has a configuration similar to that of the first shell part 22a. It is to be noted, however, that it is preferable that the ε iron oxide particles have the shell part 22 of the two-layer structure, from the viewpoint of restraining deterioration of characteristics of the ε iron oxide particles.

The ε iron oxide particles may include an additive in place of the core-shell structure, or may have the core-shell structure and includes an additive. In the cases, part of Fe of the ε iron oxide particles is replaced by the additive. With the ε iron oxide particles including the additive, also, the coercive force Hc of the ε iron oxide particles as a whole can be adjusted to a coercive force Hc suitable for recording, so that ease of recording can be enhanced. The additive is a metallic element other than iron, preferably a trivalent metallic element, and more preferably at least one kind of metallic element selected from the group consisting of aluminum (Al), gallium (Ga) and indium (In).

Specifically, the ε iron oxide including the additive is an $\varepsilon\text{-Fe}_{2-x}M_xO_3$ (here M is a metallic element other than iron, preferably a trivalent metallic element, and more preferably at least one kind of metallic element selected from the group consisting of Al, Ga and In, and x is, for example, $0<x<1$.).

The average particle size (average maximum particle size) of the magnetic powder is preferably equal to or less than 22 nm, more preferably 8 to 22 nm, and further preferably 12 to 22 nm. In the magnetic recording medium 10, a region of a size of ½ times the recording wavelength is an actual magnetization region. For this reason, by setting the average particle size of the magnetic powder to a value of equal to or less than one half the shortest recording wavelength, a good SNR can be obtained. Therefore, when the average particle size of the magnetic powder is equal to or less than 22 nm, good electro-magnetic conversion characteristics (for example, SNR) can be obtained in the magnetic recording medium 10 for high recording density (for example, a magnetic recording medium 10 configured to be able to record signals at a shortest recording wavelength of equal to or less than 44 nm). On the other hand, when the average particle size of the magnetic powder is equal to or more than 8 nm, dispersibility of the magnetic powder is more enhanced, and better electro-magnetic conversion characteristics (for example, SNR) can be obtained.

The average aspect ratio of the magnetic powder is preferably from 1.0 to 3.0, more preferably from 1.0 to 2.9, and further preferably from 1.0 to 2.5. When the average aspect ratio of the magnetic powder is in the above-mentioned numerical value range, aggregation of the magnetic powder can be restrained, and, at the time of perpendicularly orienting the magnetic powder in a step of forming the magnetic layer 13, resistance exerted on the magnetic powder can be restrained. Therefore, perpendicular orientability of the magnetic powder can be enhanced.

In the case where the magnetic powder includes ε iron oxide particles, the average particle size and the average aspect ratio of the magnetic powder are obtained as follows.

First, the magnetic recording medium 10 as a measurement object is subjected to slicing by processing by an FIB (Focused Ion Beam) method or the like. In the case of using the FIB method, as a pretreatment for observation of a TEM image of a section which will be described later, a carbon film and a tungsten thin film are formed as protective films. The carbon film is formed on the magnetic layer side surface and the back layer side surface of the magnetic recording medium 10 by a vapor deposition method, and the tungsten thin film is further formed over the magnetic layer side surface by a vapor deposition method or a sputtering method. The slicing is conducted along the lengthwise direction (longitudinal direction) of the magnetic recording medium 10. In other words, by the slicing, a section parallel to both the longitudinal direction and the thickness direction of the magnetic recording medium 10 is formed.

The section of the sliced sample thus obtained is subjected to section observation by use of a transmission electron microscope (H-9500, produced by Hitachi High-Technologies Corporation) under the conditions of an acceleration voltage of 200 kV an a total magnification of 500,000 such that the whole body of the magnetic layer 13 is included in the thickness direction of the magnetic layer 13 to pick up a TEM photograph.

Next, from the TEM photograph picked up, 50 particles are selected of which the shape can be clearly confirmed, and a long axis length DL and a short axis length DS of each particle are measured. Here, the long axis length DL means a maximum one of distances between two parallel lines of lines drawn in all angles such as to touch the profile of each particle (so-called maximum Feret's diameter). In contrast, the short axis length DS means a maximum one of the particle lengths in the direction orthogonal to the long axis (DL) of the particle.

Subsequently, the long axis lengths DL of the 50 particles thus measured are simply averaged (arithmetic mean), to obtain an average long axis length $DL_{ave}$. The average long axis length $DL_{ave}$ obtained in this way is adopted as the average particle size of the magnetic powder. In addition, the short axis lengths DS of the 50 particles measured are simply averaged (arithmetic mean), to obtain the average short axis length $DS_{ave}$. Then, the average aspect ratio ($DL_{ave}/DS_{ave}$) is obtained from the average long axis length $DL_{ave}$ and the average short axis length $DS_{ave}$.

The average particle volume of the magnetic powder may be preferably equal to or less than 2,300 nm$^3$, more preferably equal to or less than 2,200 nm$^3$, further preferably equal to or less than 2,100 nm$^3$, and particularly preferably equal to or less than 2,000 nm$^3$. The average particle volume of the magnetic powder may be preferably equal to or more than 500 nm$^3$, more preferably equal to or more than 700 nm$^3$, and further preferably equal to or more than 1,000 nm$^3$.

In the case where the average particle volume of the magnetic powder is equal to or less than the above-mentioned upper limit (for example, equal to or less than 2,300 nm$^3$), good electro-magnetic conversion characteristics (for example, SNR) can be obtained in the magnetic recording medium 10 for high recording density. In the case where the average particle volume of the magnetic powder is equal to or more than the above-mentioned lower limit (for example, equal to or more than 500 nm$^3$), dispersibility of the magnetic powder is more enhanced, and better electro-magnetic conversion characteristics (for example, SNR) can be obtained.

In the case where the ε iron oxide particles have a spherical or substantially spherical shape, the average particle volume of the magnetic powder is obtained as follows. First, the average long axis length $DL_{ave}$ is obtained, similarly to the method of calculating the average particle size of the magnetic powder described above. Next, the average volume V of the magnetic powder is obtained from the following formula.

$$V = (\pi/6) \times DL_{ave}^3$$

In the case where the ε iron oxide particles have a cubic shape, the average volume of the magnetic powder is obtained as follows.

The magnetic recording medium 10 is subjected to slicing by processing by an FIB (Focused Ion Beam) method or the like. In the case of using the FIB method, as a pretreatment for observation of a TEM image of a section which will be described later, a carbon film and a tungsten thin film are formed as protective films. The carbon film is formed on the magnetic layer side surface and the back layer side surface of the magnetic recording medium 10 by a vapor deposition method, and the tungsten thin film is further formed over the magnetic layer side surface by a vapor deposition method or a sputtering method. The slicing is conducted along the lengthwise direction (longitudinal direction) of the magnetic recording medium 10. In other words, by the slicing, a section parallel to both the longitudinal direction and the thickness direction of the magnetic recording medium 10 is formed.

The sliced sample obtained is subjected to section observation by use of a transmission electron microscope (H-9500, produced by Hitachi High-Technologies Corporation) under the conditions of an acceleration voltage of 200 kV and a total magnification of 500,000 such that the whole body of the magnetic layer 13 is included in the thickness direction of the magnetic layer 13, to obtain a TEM photograph. Note that the magnification and the acceleration voltage may be adjusted, as required, according to the kind of an apparatus.

Next, from the TEM photograph picked up, 50 particles are selected of which the shape is clear, and the length DC of a side of each particle is measured. Subsequently, the lengths DC of the sides of the 50 particles measured are simply averaged (arithmetic mean), to obtain the average side length $DC_{ave}$. Next, using the average side length $DC_{ave}$, the average volume $V_{ave}$ (particle volume) of the magnetic powder is obtained from the following formula.

$$V_{ave} = DV_{ave}^3$$

The coercive force Hc of the ε iron oxide particles is preferably equal to or more than 2,500 Oe, and more preferably from 2,800 to 4,200 e.

(Embodiment in which Magnetic Powder Includes Co-Containing Spinel Ferrite)

According to a further preferred embodiment of the present disclosure, the magnetic powder may include nano particles containing Co-containing spinel ferrite (hereinafter referred to also as "cobalt ferrite particles"). In other words, the magnetic powder may be a cobalt ferrite magnetic powder. The cobalt ferrite particles preferably have a uniaxial crystal anisotropy. The cobalt ferrite magnetic particles have, for example, a cubic or substantially cubic shape. The Co-containing spinel ferrite may further contain at least one kind of metal selected from the group consisting of Ni, Mn, Al, Cu and Zn, other than Co.

The cobalt ferrite has an average composition represented, for example, by the following formula (1):

$$Co_xM_yFe_2O_z \qquad (1)$$

(In the formula (1), M is at least one kind of metal selected from the group consisting, for example, of Ni, Mn, Al, Cu and Zn; x is a value in the range of $0.4 \leq x \leq 1.0$; y is a value in the range of $0 \leq y \leq 0.3$; it is to be noted that x and y satisfy the relation of $(x+y) \leq 1.0$; Z is a value in the range of $3 \leq z \leq 4$; and part of Fe may be replaced by other metallic element.)

The average particle size of the cobalt ferrite magnetic powder is preferably equal to or less than 25 nm, and more preferably equal to or less than 23 nm. The coercive force Hc of the cobalt ferrite magnetic powder is preferably equal to or more than 2,500 Oe, and more preferably from 2,600 to 3,500 Oe.

In the case where the magnetic powder includes a powder of cobalt ferrite particles, the average particle size of the magnetic powder is preferably equal to or less than 25 nm, and more preferably from 10 to 23 nm. When the average particle size of the magnetic powder is equal to or less than 25 nm, good electro-magnetic conversion characteristics (for example, SNR) can be obtained in the magnetic recording medium 10 for high recording density. When the average particle size of the magnetic powder is equal to or more than 10 nm, dispersibility of the magnetic powder is more enhanced, and better electro-magnetic conversion characteristics (for example, SNR) can be obtained. In the case where the magnetic powder includes a powder of cobalt ferrite particles, the average aspect ratio and the average particle size of the magnetic powder can be obtained by the same method as that in the case where the magnetic powder includes the ε iron oxide particles.

The average particle volume of the magnetic powder may be preferably equal to or less than 2,300 $nm^3$, more preferably equal to or less than 2,200 $nm^3$, further preferably equal to or less than 2,100 $nm^3$, and particularly preferably equal to or less than 2,000 $nm^3$. The average particle volume of the magnetic powder may be preferably equal to or more than 500 $nm^3$, more preferably equal to or more than 700 $nm^3$, and further preferably equal to or more than 1,000 $nm^3$.

In the case where the average particle volume of the magnetic powder is equal to or less than the above-mentioned upper limit (for example, equal to or less than 2,300 $nm^3$), good electro-magnetic conversion characteristics (for example, SNR) can be obtained in the magnetic recording medium 10 for high recording density. In the case where the average particle volume of the magnetic powder is equal to or more than the above-mentioned lower limit (for example, equal to or more than 500 $nm^3$), dispersibility of the magnetic powder is more enhanced, and better electro-magnetic conversion characteristics (for example, SNR) can be obtained.

(Binder)

As a binder, a resin having a structure in which a crosslinking reaction is applied to a polyurethane resin or a vinyl chloride resin or the like is preferred. However, the binder is not limited to these, and other resin or resins may be blended, as required, according to the physical properties and the like required of the magnetic recording medium 10. The resin or resins to be blended are not particularly limited, insofar as they are resins generally used in a coating type magnetic recording medium 10.

As the binder, there may be used one or a combination of two or more selected from among, for example, polyvinyl chloride, polyvinyl acetate, vinyl chloride-vinyl acetate copolymer, vinyl chloride-vinylidene chloride copolymer, vinyl chloride-acrylonitrile copolymer, acrylic acid ester-acrylonitrile copolymer, acrylic acid ester-vinyl chloride-vinylidene chloride copolymer, acrylic acid ester-vinylidene chloride copolymer, methacrylic acid ester-vinylidene chloride copolymer, methacrylic acid ester-vinyl chloride copolymer, methacrylic acid ester-ethylene copolymer, polyvinyl fluoride, vinylidene chloride-acrylonitrile copolymer, acrylonitrile-butadiene copolymer, polyamide resins, polyvinyl butyral, cellulose derivatives (cellulose acetate butyrate, cellulose diacetate, cellulose triacetate, cellulose propionate, nitrocellulose), styrene-butadiene copolymer, polyester resins, amino resins, and synthetic rubbers.

In addition, as the binder, thermosetting resins or reaction-type resins may be used. Examples of the thermosetting resins or the reaction-type resins include phenolic resins, epoxy resins, urea resins, melamine resins, alkyd resins, silicone resins, polyamine resins, and urea-formaldehyde resins.

In addition, for the purpose of enhancing dispersibility of the magnetic powder, a functional group such as —$SO_3M$, —$OSO_3M$, —COOM, and P=O(OM)$_2$ may be introduced to each of the above-mentioned binders. Here, M is a hydrogen atom or an alkali metal such as lithium, potassium and sodium.

Further, examples of the functional group include side chain type ones having a terminal group of —NR1R2 or —NR1R2R3$^+$X$^-$, and main chain type ones of >NR1R2$^+$X$^-$. Here, R1, R2 and R3 are independently a hydrogen atom or a hydrocarbon group, X$^-$ is a halogen ion of, for example, fluorine, chlorine, bromine or iodine or the like, or an inorganic or organic ion. Besides, examples of the functional group include —OH, —SH, —CN and epoxy group. The amount of these functional groups to be introduced into the binder is preferably $10^{-1}$ to $10^{-8}$ mol/g, and more preferably $10^{-2}$ to $10^{-6}$ mol/g.

(Lubricant)

The magnetic layer may include a lubricant. The lubricant may be one or more kinds of materials selected from among, for example, fatty acids and/or fatty acid esters, and may preferably include both a fatty acid and a fatty acid ester. The fatty acid may be preferably a compound represented by the following general formula (1) or (2). For example, one of a compound represented by the following general formula (1) and a compound represented by the following general formula (2), or both of the compounds, may be included as the fatty acid.

In addition, the fatty acid ester may be preferably a compound represented by the following general formula (3) or (4). For example, one of a compound represented by the following general formula (3) and a compound represented by the following general formula (4), or both of the compounds, may be included as the fatty acid ester.

With the lubricant including either one or both of a compound represented by the general formula (1) and a compound represented by the general formula (2) and either one or both of a compound represented by the general formula (3) and a compound represented by the general formula (4), an increase in dynamic frictional coefficient due to repeated recording or reproduction on the magnetic recording medium can be restrained.

(In the general formula (1), k is an integer selected from the range of 14 to 22, preferably the range of 14 to 18.)

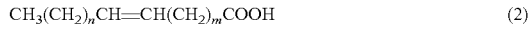

(In the general formula (2), the sum of n and m is an integer selected from the range of 12 to 20, preferably the range of 14 to 18.)

(In the general formula (3), p is an integer selected from the range of 14 to 22, preferably from the range of 14 to 18, and q is an integer selected from the range of 2 to 5, preferably the range of 2 to 4.)

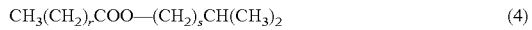

(In the general formula (4), r is an integer selected from the range of 14 to 22, and s is an integer selected from the range of 1 to 3.)

Examples of the lubricant include esters of a monobasic fatty acid having 10 to 24 carbon atoms with any one of monovalent to hexavalent alcohols having 2 to 12 carbon atoms, mixed esters of these, di-fatty acid esters, and tri-fatty acid esters. Specific examples of the lubricant include lauric acid, myristic acid, palmitic acid, stearic acid, behenic acid, oleic acid, linoleic acid, linolenic acid, elaidic acid, butyl stearate, pentyl stearate, heptyl stearate, octyl stearate, isooctyl stearate, and octyl myristate.

(Antistatic Agent)

Examples of the antistatic agent include carbon black, natural surfactants, nonionic surfactants, and cationic surfactants.

(Abrasive)

Examples of the abrasive includes α-alumina having an a conversion rate of equal to or more than 90%, β-alumina, γ-alumina, silicon carbide, chromium oxide, cerium oxide, α-iron oxide, corundum, silicon nitride, titanium carbide, titanium oxide, silicon dioxide, tin oxide, magnesium oxide, tungsten oxide, zirconium oxide, boron oxide, zinc oxide, calcium carbonate, calcium sulfate, barium sulfate, molybdenum disulfide, acicular α-iron oxide prepared by subjecting a raw material of magnetic iron oxide to dehydration and an annealing treatment, and materials obtained by subjecting these to a surface treatment with aluminum and/or silica, as required.

(Curing Agent)

Examples of the curing agent include polyisocyanate. Specific examples of the polyisocyanate include an aromatic polyisocyante such as an adduct of tolylene diisocyanate (TDI) and an active hydrogen compound, and an aliphatic polyisocyanate such as an adduct of hexamethylene diisocynate (HMDI) and an active hydrogen compound. The weight average molecular weight of these polyisocyanates is desirably in the range of 100 to 4,500.

(Rust-Preventive Agent)

Examples of the rust-preventive agent include phenols, naphthols, quinones, heterocyclic compounds containing a nitrogen atom, heterocyclic compounds containing an oxygen atom, and heterocyclic compounds containing a sulfur atom.

(Nonmagnetic Reinforcement Particles)

Examples of the nonmagnetic reinforcement particles include aluminum oxide (α, β or γ alumina), chromium oxide, silicon oxide, diamond, garnet, emery, boron nitride, titanium carbide, silicon carbide, titanium carbide, and titanium oxide (rutile type or anatase type titanium oxide).

(Ground Layer)

The ground layer 12 is a nonmagnetic layer including a nonmagnetic powder and a binder. The ground layer 12 may further include at least one kind of additive selected from among a lubricant, an antistatic agent, a curing agent, a rust-preventive agent and the like, as required.

The average thickness of the ground layer 12 is preferably 0.6 to 2.0 μm, and more preferably 0.8 to 1.4 μm. The average thickness of the ground layer 12 can be obtained similarly to the average thickness of the magnetic layer 13. It is to be noted, however, that magnification of the TEM image is adjusted, as required, according to the thickness of the ground layer 12.

In a preferred embodiment of the present disclosure, the ground layer 12 is provided between the magnetic layer 13 and the substrate 11, and the average thickness of the ground layer 12 may be equal to or less than 2.0 μm.

(Nonmagnetic Powder)

The nonmagnetic powder includes at least one kind of powder selected from among, for example, an inorganic particle powder and an organic particle powder. In addition, the nonmagnetic powder may include a carbon powder such as carbon black. Note that one kind of nonmagnetic powder may be used singly, or two or more kinds of nonmagnetic powders may be used in combination. The inorganic particles include, for example, a metal, a metallic oxide, a metallic carbonate, a metallic sulfate, a metallic nitride, a metallic carbide, a metallic sulfide or the like. Examples of the shape of the nonmagnetic powder include various shapes such as acicular shape, spherical shape, cubic shape and plate-like shape, but these shapes are not limitative.

(Binder)

The description concerning the binder included in the magnetic layer 13 above applies also to the binder included in the ground layer.

(Additive)

The description concerning the lubricant, antistatic agent, curing agent and rust-preventive agent included in the magnetic layer 13 above applies also to the lubricant, antistatic agent, curing agent and rust-preventive agent included in the ground layer.

(Back Layer)

The back layer 14 may include a binder and a nonmagnetic powder. The back layer 14 may further include at least one kind of additive selected from among a lubricant, a curing agent, an antistatic agent and the like, as required. The description concerning the binder and the nonmagnetic powder included in the ground layer 12 above applies also to the binder and the nonmagnetic powder included in the back layer.

The average particle size of the nonmagnetic powder is preferably 10 to 150 nm, and more preferably 15 to 110 nm. The average particle size of the nonmagnetic powder can be obtained similarly to the average particle size of the magnetic powder mentioned above. The nonmagnetic powder may include nonmagnetic powders having two or more particle size distributions.

The average thickness (herein referred to also as "average thickness $t_b$" or "$t_b$") of the back layer 14 is preferably equal to or less than 0.6 µm. With the average thickness $t_b$ of the back layer 14 in the above-mentioned range, even in the case where the average thickness of the magnetic recording medium 10 is set to be, for example, equal to or less than 5.6 µm, the thicknesses of the ground layer 12 and the substrate 11 can be kept large, whereby traveling stability of the magnetic recording medium 10 in a recording/reproduction apparatus can be maintained. A lower limit for the average thickness $t_b$ of the back layer 14 is not particularly limited, but it is, for example, equal to or more than 0.2 µm.

In a preferred embodiment of the present disclosure, the back layer 14 is provided on a surface on the side opposite to the surface on the side on which the magnetic layer 13 is provided, of the two surfaces of the substrate 11, and the average thickness of the back layer 14 may be equal to or less than 0.6 µm.

The average thickness $t_b$ of the back layer 14 is obtained as follows. First, the average thickness $t_T$ of the magnetic recording medium 10 is measured. The method for measuring the average thickness $t_T$ is as described hereinbelow. Subsequently, the back layer 14 of the sample is removed by a solvent such as MEK (methyl ethyl ketone) or diluted hydrochloric acid. Next, using a laser hologage (LGH-110C) produced by Mitutoyo Corporation, the thickness of the sample is measured at five or more locations, and the measurement values are simply averaged (arithmetic mean), to calculate an average $t_B$ [µm]. Thereafter, the average thickness $t_b$ [µm] of the back layer 14 is obtained from the following formula. Note that the measurement positions are selected at random from the sample. $t_b$ [µm]=$t_T$ [µm]−$t_B$ [µm]

(Average Thickness $t_T$ of Magnetic Recording Medium)

The average thickness (herein referred to also as "average thickness $t_T$" or "$t_T$") of the magnetic recording medium 10 may be $t_T \leq 5.6$ µm, preferably equal to or less than 5.3 µm, more preferably equal to or less than 5.2 µm, equal to or less than 5.0 µm, or equal to or less than 4.6 µm. With the average thickness $t_T$ of the magnetic recording medium 10 being within the above-mentioned numerical value range (for example, with $t_T \leq 5.6$ µm), the recording capacity which can be recorded in one data cartridge can be enhanced as compared with the conventional capacity. A lower limit for the average thickness $t_T$ of the magnetic recording medium 10 is not particularly limited, but, for example, 3.5 µm$\leq t_T$.

The average thickness $t_T$ of the magnetic recording medium 10 is obtained as follows. First, a magnetic recording medium 10 which is ½ inch in width is prepared, and is cut out to a length of 250 mm, to produce a sample. Next, using a laser hologage (LGH-110C) produced by Mitutoyo Corporation as a measuring instrument, the thickness of the sample is measured at five or more locations, and the measurement values are simply averaged (arithmetic mean), to calculate an average $t_T$ [µm]. Note that measurement positions are selected at random from the sample.

(Coercive Force Hc1 in Perpendicular Direction)

The coercive force Hc1 in the perpendicular direction may be equal to or less than 4,500 Oe, more preferably equal to or less than 3,500 Oe, and further preferably equal to or less than 3,000 Oe, equal to or less than 2,900 Oe, or equal to or less than 2,850 Oe. It is preferable that the coercive force Hc1 is great, since the possibility of influences by thermal agitation and diamagnetic field is lowered. If the coercive force Hc1 exceeds 4,500 Oe, however, it may become difficult to perform saturated recording by the recording head, so that there is a part which cannot be recorded, and noise is increased, resulting in worsening of electro-magnetic conversion characteristics (for example, C/N).

The coercive force Hc1 in the perpendicular direction may be preferably equal to or more than 500 Oe, more preferably equal to or more than 1,000 Oe, and further preferably equal to or more than 1,500 Oe, or equal to or more than 2,000 Oe. When the coercive force Hc1 is equal to or more than the above-mentioned lower limit, it is possible to restrain a lowering in electro-magnetic conversion characteristics (for example, C/N) in a high-temperature environment due to the influence of thermal agitation and the influence of diamagnetic field.

The coercive force Hc1 in the perpendicular direction is obtained as follows. First, three magnetic recording media 10 are laminated by use of a double-sided adhesive tape, and the laminate is blanked by a φ6.39 mm punch, to produce a measurement sample. In this case, marking is conducted using a nonmagnetic arbitrary ink, such that the longitudinal direction (traveling direction) of the magnetic recording medium can be recognized. Then, using a vibrating sample magnetometer (VSM), an M-H loop of the measurement sample (the magnetic recording medium 10 as a whole) corresponding to the vertical direction of the magnetic recording medium 10 ((the thickness direction of the magnetic recording medium 10) is measured. Next, the coating films (the ground layer 12, the magnetic layer 13 and the back layer 14, etc.) are wiped off by use of acetone, ethanol or the like, leaving only the substrate 11. Three such substrate 11 obtained are laminated by use of a double-sided adhesive tape, and the laminate is blanked by a φ6.39 mm punch, to obtain a sample for background correction (hereinafter referred to simply as correction sample). Thereafter, using the VSM, an M-H loop of the correction sample (substrates 11) corresponding to the perpendicular direction of the substrate 11 (the thickness direction of the magnetic recording medium 10) is measured.

In the measurement of the M-H loop of the measurement sample (the magnetic recording medium 10 as a whole) and the M-H loop of the correction sample (the substrates 11), a high-sensitivity vibrating sample magnetometer "VSM-P7-15 model" produced by Toei Industry Co., Ltd. is used. The measurement conditions are measurement mode: full loop, maximum magnetic field: 15 kOe, magnetic field step: 40 bit, Time constant of Locking amp: 0.3 sec, Waiting time: 1 sec, and MH average number: 20.

After the two M-H loops are obtained, the M-H loop of the correction sample (substrates 11) is subtracted from the M-H loop of the measurement sample (the magnetic recording medium 10 as a whole), whereby background correction is performed, and an M-H loop after background correction is obtained. For calculation of the background correction, a measurement and analysis program attached to "VSM-P7-15 model" is used.

From the M-H loop after background correction thus obtained, the coercive force Hc1 in the perpendicular direction is obtained. Note that for this calculation, the measurement and analysis program attached to "VSM-P7-15 model" is used. Note that the measurements of M-H loops above are both conducted at 25° C. In addition, "diamagnetic field correction" at the time of measuring the M-H loop in the perpendicular direction of the magnetic recording medium 10 is not performed.

(Coercive Force Hc2 in Longitudinal Direction)

The coercive force Hc2 in the longitudinal direction is preferably equal to or less than 2,000 Oe, more preferably equal to or less than 1,900 Oe, and further preferably equal to or less than 1,800 Oe. When the coercive force Hc2 in the longitudinal direction is equal to or less than 2,000 Oe, magnetization more sensitively responds to a magnetic field in the perpendicular direction from the recording head, and, therefore, good record patterns can be formed.

The coercive force Hc2 in the longitudinal direction is preferably equal to or more than 1,000 Oe. When the coercive force Hc2 in the longitudinal direction is equal to or more than 1,000 Oe, demagnetization due to leakage flux from the recording head can be restrained.

The coercive force Hc2 is obtained as follows.

First, three magnetic recording media 10 are laminated by use of a double-sided adhesive tape, and the laminate is blanked by a φ6.39 mm punch, to produce a measurement sample. In this instance, marking is conducted using a nonmagnetic arbitrary ink, such that the longitudinal direction (traveling direction) of the magnetic recording medium 10 can be recognized. Then, using a vibrating sample magnetometer (VSM), an M-H loop of the measurement sample (the magnetic recording medium 10 as a whole) corresponding to the longitudinal direction (traveling direction) of the magnetic recording medium 10 is measured. Next, coating films (the ground layer 12, the magnetic layer 13 and the back layer 14, etc.) are wiped off using acetone or ethanol or the like, leaving only the substrate 11. Three such substrates 11 obtained are laminated by use of a double-sided adhesive tape, and the laminate is blanked by a φ6.39 mm punch, to produce a sample for background correction (hereinafter referred to simply as "correction sample"). Thereafter, using the VSM, an M-H loop of the correction sample (the substrates 11) corresponding to the perpendicular direction of the substrate 11 (the perpendicular direction of the magnetic recording medium 10) is measured.

In the measurements of the M-H loop of the measurement sample (the magnetic recording medium 10 as a whole) and the M-H loop of the correction sample (the substrates 11), a high-sensitivity vibrating sample magnetometer "VSM-P7-15 model" produced by Toei Industry Co., Ltd. is used. The measurement conditions are measurement mode: full loop, maximum magnetic field: 15 kOe, magnetic field step: 40 bit, Time constant of Locking amp: 0.3 sec, Waiting time: 1 sec, and MH average number: 20.

After the M-H loop of the measurement sample (the magnetic recording medium 10 as a whole) and the M-H loop of the correction sample (the substrates 11) are obtained, the M-H loop of the correction sample (the substrates 11) is subtracted from the M-H loop of the measurement sample (the magnetic recording medium 10 as a whole), whereby background correction is performed, and an M-H loop after background correction is obtained. For calculation of the background correction, the measurement and analysis program attached to "VSM-P7-15 model" is used.

From the M-H loop after background correction thus obtained, the coercive force Hc is obtained. Note that for this calculation, the measurement and analysis program attached to "VSM-P7-15 model" is used. Note that the measurements of the M-H loops are both conducted at 25° C. In addition, "diamagnetic field correction" at the time of measuring the M-H loop in the longitudinal direction of the magnetic recording medium 10 is not performed.

(Hc2/Hc1)

The ratio Hc2/Hc1 of the coercive force Hc2 in the longitudinal direction and the coercive force Hc1 in the perpendicular direction satisfies the relation of Hc2/Hc1≤0.8, preferably Hc2/Hc1≤0.75, more preferably Hc2/Hc1≤0.7, further preferably Hc2/Hc1≤0.65, and particularly preferably Hc2/Hc1≤0.6. With the coercive forces Hc1 and Hc2 satisfying the above-mentioned relation, perpendicular orientation of the magnetic powder can be enhanced. Therefore, it is possible to reduce a magnetization transition width and to obtain high-output signals at the time of signal reproduction, so that electro-magnetic conversion characteristics (for example, C/N) can be enhanced. Note that, as described above, when Hc2 is small, magnetization more sensitively responds to a magnetic field in the perpendicular direction from the recording head, so that good record patterns can be formed.

In the case where the ration Hc2/Hc1 is Hc2/Hc1≤0.8, it is particularly effective that the average thickness of the magnetic layer 13 is equal to or less than 90 nm. When the average thickness of the magnetic layer 13 exceeds 90 nm, in the case where a ring-type head is used as the recording head, a lower region (a region on the ground layer 12 side) of the magnetic layer 13 would be magnetized in the longitudinal direction, and it may become impossible to uniformly magnetize the magnetic layer 13 in the thickness direction. Therefore, it may be impossible to enhance electro-magnetic conversion characteristics (for example, C/N) even when the Hc2/Hc1 is set to be Hc2/Hc1≤0.8 (namely, even when the degree of perpendicular orientation of the magnetic powder is enhanced).

A lower limit for the Hc2/Hc1 is not particularly limited, but, for example, 0.5≤Hc2/Hc1.

Note that Hc2/Hc1 represents the degree of perpendicular orientation of the magnetic powder, and the degree of perpendicular orientation of the magnetic powder is higher as Hc2/Hc1 is smaller. The reason that Hc2/Hc1 is used as an index indicating the degree of perpendicular orientation of the magnetic powder in the present embodiment will be described below.

Hitherto, squareness ratio SQ (=(Mr/Ms)×100, where Mr (emu) is residual magnetization, and Ms (emu) is saturation magnetization) has been generally used as an index (parameter) indicating the degree of perpendicular magnetization of a magnetic powder. However, according to the present inventors' knowledge, the index of squareness ratio SQ is less suitable as an index indicating the degree of perpendicular orientation of a magnetic powder than Hc2/Hc1, for the following reasons.

Figure 6:
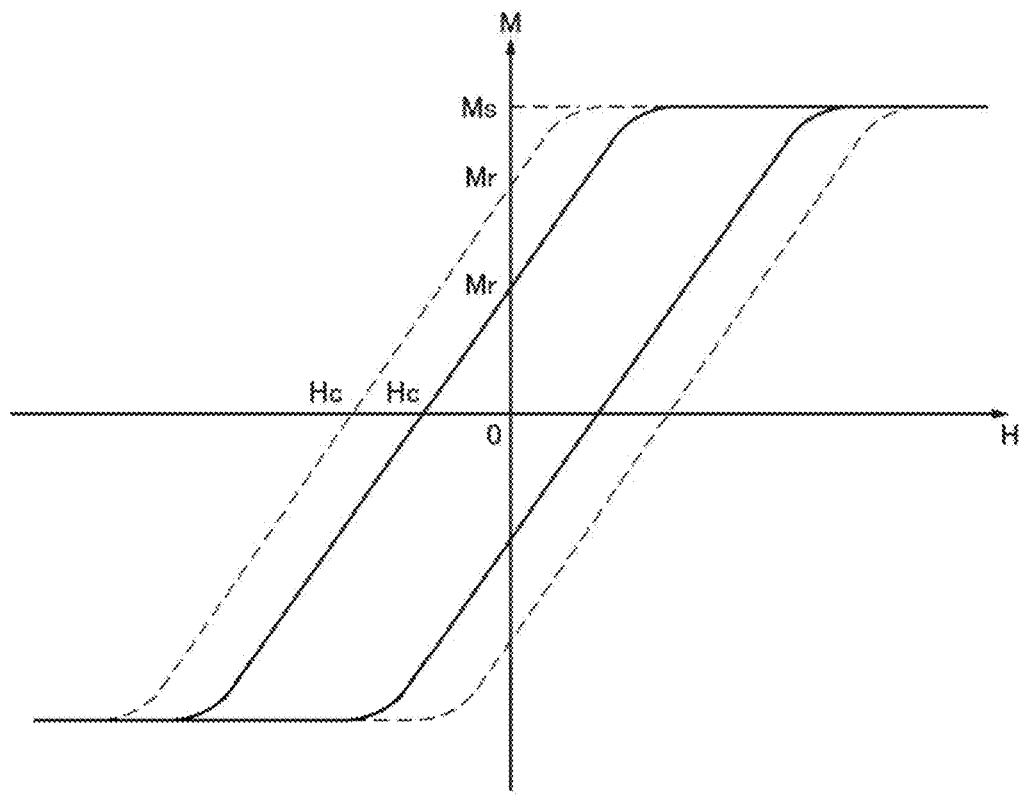
FIG. 6 is a graph depicting an example of an M-H loop.

(1) The squareness ratio SQ would vary according to the value of coercive force Hc of the magnetic powder. For example, as depicted in FIG. 6, when the coercive force Hc of the magnetic powder increases, the squareness ratio SQ also increases on an apparent basis.

(2) The squareness ratio SQ would be influenced by the distortion of the M-H loop due to overdispersion.

In view of this, in the present embodiment, Hc2/Hc1 is used as an index for indicating the degree of orientation of a magnetic powder more suitably. Since the coercive forces Hc1 and Hc2 simply vary according to the orientation direction of a magnetic powder, Hc2/Hc1 is more suitable as an index for indicating the degree of orientation of a magnetic powder.

(Residual Coercive Force Hrp and Ratio Hrp/Hc1)

In the magnetic recording medium of the present disclosure, the ratio Hrp/Hc1 of residual coercive force Hrp of the magnetic recording medium and the coercive force Hc1 in the perpendicular direction of the magnetic recording medium which are measured using a pulsed magnetic field is equal to or less than 2.0, preferably equal to or less than 1.95, more preferably equal to or less than 1.90, and particularly preferably equal to or less than 1.85. The magnetic recording medium of the present disclosure, by having the ratio Hrp/Hc1 in the above-mentioned numerical value range, is excellent in thermal stability, notwithstanding the small average particle volume of the magnetic powder.

The ratio Hrp/Hc1 may be, for example, equal to or more than 0, equal to or more than 0.5, or equal to or more than 1.0.

Hc1 used for calculation of the ratio Hrp/Hc1 is measured as described above.

Hrp used for calculation of the ratio Hrp/Hc1 is obtained as follows.

As a measurement sample, a sample similar to the sample used for calculation of the coercive force Hc1 is prepared. Using a high speed response characteristics evaluation apparatus HR-PVSM20, produced by Hayama, residual magnetization curve in a direction perpendicular to a film surface is obtained as follows.

First, a magnetic field in the perpendicular direction of approximately −3,980 kA/m (−50 kOe) is applied to the measurement sample, and the magnetic field is returned to zero, to set the measurement sample in a residual magnetization state. Thereafter, a magnetic field of approximately 40.2 kA/m (approximately 505 Oe) is applied in the opposite direction, the magnetic field is again returned to zero, and residual magnetization is measured. The magnetic field applied in this instance, is a pulsed magnetic field with a pulse width on the order of $10^{-8}$ sec. Thereafter, similarly, measurement of applying a magnetic field higher than the previously applied magnetic field by approximately 40.2 kA/m and returning the magnetic field to zero is repeated, and residual magnetization quantity is plotted against the applied magnetic field, to produce a DCD curve. The measurement magnetic field is up to approximately 20 kOe. Note that background correction and diamagnetic field correction are not performed.

Figure 7:
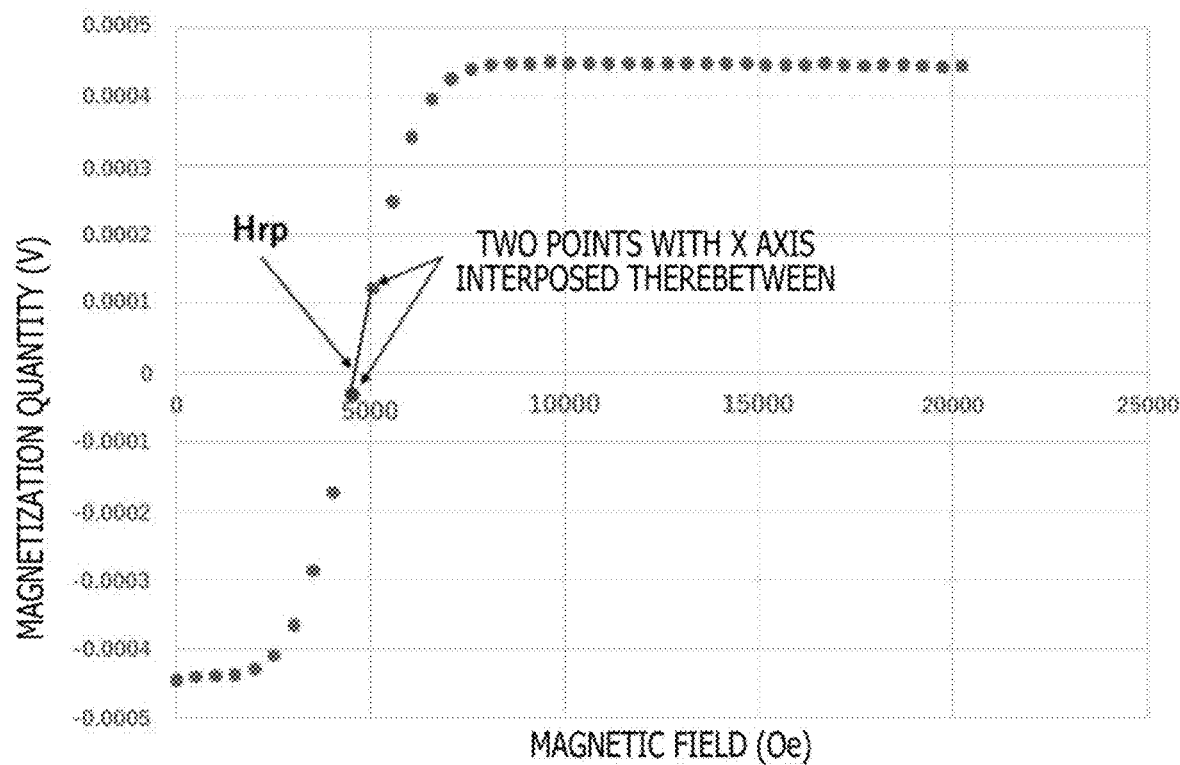
FIG. 7 is an example of a residual magnetization curve.

The measurement conditions are as follows.
  Initial magnetizing voltage: 220 V
  (corresponding to −3,980 kA/m)
  Measurement start voltage: 0 V
  (corresponding to 0 Oe)
  Step voltage: 17.5 V
  (corresponding to approximately 505 Oe)
  Maximum voltage: 350 V
  (corresponding to 20 kOe)
  Waiting time of lock-in amplifier: 10 sec From the data obtained by the measurement as above, a residual magnetization curve as depicted in FIG. 7, for example, is obtained. For obtaining the residual magnetization curve from the data, phase correction is conducted, as required. The phase correction will be described later. Of the points forming the residual magnetization curve thus obtained, two points with an X axis interposed therebetween (two points nearest to the X axis) are connected by a straight line, and the point at which the straight line intersects the X axis is calculated as Hrp.

The phase correction will be described in detail below.

While the unit of magnetization quantity is originally emu, in the case of the above-mentioned high speed response characteristics evaluation apparatus, the magnetization quantity at each applied magnetic field is outputted as a voltage V, and in regard of the magnetization quantity (voltage V) at each applied magnetic field, positive values and negative values are both outputted as positive values. Therefore, correction according to the phase of each applied magnetic field is needed. For this correction, phase information data included in the output results by the high speed response characteristics evaluation apparatus is used. The phase information data is also outputted for each applied magnetic field, together with the magnetization quantity (voltage V) at each applied magnetic field.

In the case where the phase information data on the magnetization quantity (voltage V) measured for a certain magnetic field is a negative value, it is necessary to multiply the measured magnetization quantity (voltage V) by "−1," and the value obtained by multiplying the measured magnetization quantity (voltage V) by "−1" is used for obtaining the residual magnetization curve. The treatment of multiplying by "−1" is the phase correction.

On the other hand, in the case where the phase information data on the magnetization quantity (voltage V) measured for a certain magnetic field is a positive value, it is unnecessary to multiply the measured magnetization quantity (voltage V) by "−1," and the measured magnetization quantity (voltage V) is used as it is for obtaining the residual magnetization curve.

The magnetization quantity after phase correction (the magnetization quantity obtained through multiplying by "−1") and the measured magnetization quantity (the magnetization quantity obtained without multiplying by "−1") obtained in the above-mentioned manner are plotted against the magnetic field, whereby a residual magnetization curve as depicted in FIG. 7 is obtained.

(2) Method of Manufacturing Magnetic Recording Medium

Next, a method of manufacturing the magnetic recording medium 10 having the aforementioned configuration will be described. First, a nonmagnetic powder and a binder and the like are kneaded and dispersed in a solvent, to prepare a ground layer forming coating material. Next, a magnetic powder and a binder and the like are kneaded and dispersed in a solvent, to prepare a magnetic layer forming coating material. For the preparation of the magnetic layer forming coating material and the ground layer forming coating material, for example, the following solvent, dispersing device and kneading device may be used.

Examples of the solvent to be used for preparation of the above-mentioned coating materials include: ketone solvents such as acetone, methyl ethyl ketone, methyl isobutyl ketone, and cyclohexanone; alcohol solvents such as methanol, ethanol, and propanol; ester solvents such as methyl acetate, ethyl acetate, butyl acetate, propyl acetate, ethyl lactate, and ethylene glycol acetate; ether solvents such as diethylene glycol dimethyl ether, 2-ethoxyethanol, tetrahydrofuran, and dioxane; aromatic hydrocarbon solvents such as benzene, toluene, and xylene; and halogenated hydrocarbon solvents such as methylene chloride, ethylene chloride, carbon tetrachloride, chloroform, and chlorobenzene. These may be used either singly or may be used in combination as required.

Examples of the kneading device which can be used for preparation of the aforementioned coating materials include such kneading devices as a continuous biaxial kneader capable of dilution at multiple stages, a kneader, a pressure kneader, and a roll kneader, but these devices are not particularly limitative. In addition, examples of the dispersing device which can be used for preparation of the above-mentioned coating materials include such dispersing devices as roll mill, ball mill, horizontal-type sand mill, vertical-type sand mill, spike mill, pin mill, tower mill, pearl mill (for example, "DCP Mill" produced by Eirich), homogenizer, and ultrasonic wave disperser, but these devices are not particularly limitative.

Next, the ground layer forming coating material is applied to a main surface on one side of a substrate 11, and is dried, whereby a ground layer 12 is formed. Subsequently, the magnetic layer forming coating material is applied onto the ground layer 12, and is dried, to form a magnetic layer 13 on the ground layer 12. Note that, at the time of drying, the magnetic powder is subjected to magnetic field orientation in the thickness direction of the substrate 11 by using a solenoid coil, for example. In addition, at the time of drying, by using a solenoid coil, for example, the magnetic powder may be subjected to magnetic field orientation in the traveling direction (longitudinal direction) of the substrate 11 and thereafter subjected to magnetic field orientation in the thickness direction of the substrate 11. By such a magnetic field orientation, the ratio Hc2/Hc1 can be lowered. Therefore, the degree of perpendicular orientation of the magnetic powder can be enhanced. After the formation of the magnetic layer 13, a back layer 14 is formed on a main surface on the other side of the substrate 11. By this, a magnetic recording medium 10 is obtained.

The ratio Hc2/Hc1 is set to a desired value by adjusting, for example, the intensity of a magnetic field applied to the coating film of the magnetic layer forming coating material, the concentration of solid matter in the magnetic layer forming coating material, or drying conditions (drying temperature and drying time) of the coating film of the magnetic layer forming coating material. The intensity of the magnetic field applied to the coating film is preferably 2 to 3 times the coercive force of the magnetic powder. In order to further enhance the ratio Hc2/Hc1, it is preferable to enhance the dispersed state of the magnetic powder in the magnetic layer forming coating material. In addition, in order to further enhance the ratio Hc2/Hc1, it is also effective to preliminarily magnetize the magnetic powder, before the magnetic layer forming coating material is placed into an orienting device for magnetic field orientation of the magnetic powder. Note that the above-mentioned methods for adjusting the ratio Hc2/Hc1 may be used singly, or may be used in combination of two or more of them.

The ratio Hrp/Hc1 can be controlled by, for example, adjusting the orientation conditions in the above-mentioned magnetic field orientation treatment and/or adjusting the coercive force of the magnetic powder. In addition, the ratio Hrp/Hc1 can also be adjusted by altering the kind of the magnetic powder, or the average particle volume, average aspect ratio or average particle sized of the magnetic powder.

Thereafter, the magnetic recording medium 10 obtained is re-wound around a large-diameter core, and is subjected to a curing treatment. Finally, the magnetic recording medium 10 is subjected to a calender treatment, after which it is cut to a preobtained width (for example, ½ inch width). As a result, a desired elongate long magnetic recording medium 10 is obtained.

(3) Recording/Reproduction Apparatus
[Configuration of Recording/Reproduction Apparatus]

Next, referring to FIG. 8, an example of the configuration of a recording/reproduction apparatus 30 for recording and reproduction on the magnetic recording medium 10 having the aforementioned configuration will be described.

The recording/reproduction apparatus 30 has a configuration in which a tension exerted in the longitudinal direction of the magnetic recording medium 10 can be adjusted. In addition, the recording/reproduction apparatus 30 has a configuration in which a magnetic recording cartridge 10A can be mounted therein. Here, for ease of description, a case where the recording/reproduction apparatus has a configuration in which one magnetic recording cartridge 10A can be mounted therein, but the recording/reproduction apparatus 30 may have a configuration in which a plurality of magnetic recording cartridges 10A can be mounted therein.

The recording/reproduction apparatus 30 is connected to an information processing apparatus such as a server 41 and a personal computer (hereinafter referred to as "PC") 42 through a network 43, and is configured to be able to record data, supplied from these information processing apparatuses, in the magnetic recording cartridge 10A. The shortest recording wavelength of the recording/reproduction apparatus 30 is preferably equal to or less than 100 nm, more preferably equal to or less than 75 nm, further preferably equal to or less than 60 nm, and particularly preferably equal to or less than 50 nm.

Figure 8:
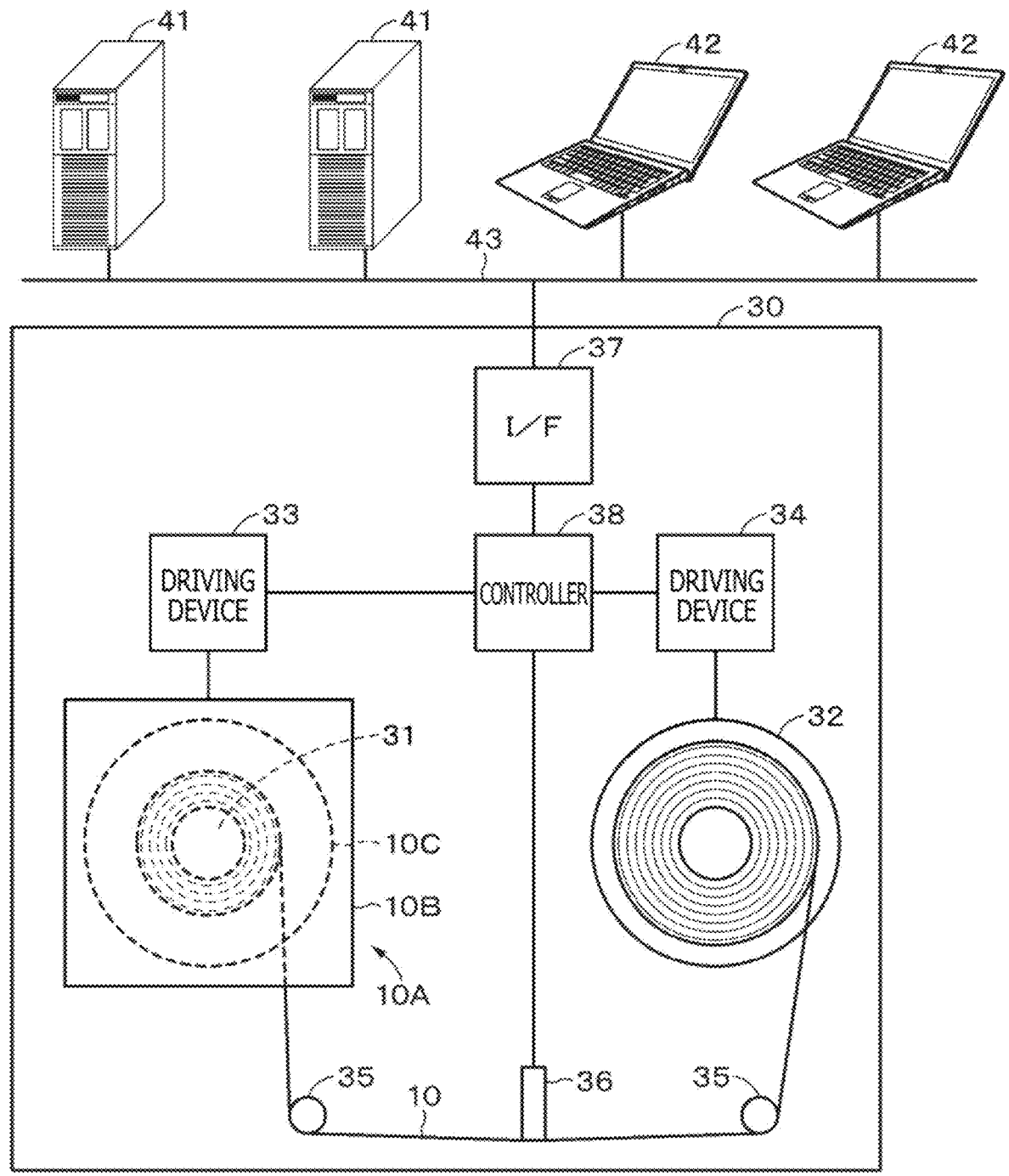
FIG. 8 is a schematic diagram of a recording/reproduction apparatus.

As illustrated in FIG. 8, the recording/reproduction apparatus 30 includes a spindle 31, a reel 32 on the recording/reproduction apparatus side, a spindle driving device 33, a reel driving device 34, a plurality of guide rollers 35, a head unit 36, a communication interface (hereinafter referred to as "I/F") 37, and a controller 38.

The spindle 31 is configured such that the magnetic recording cartridge 10A can be mounted thereto. The magnetic recording cartridge 10A accords to the LTO (Linear Tape Open) standard, in which a single reel 10C with the magnetic recording medium 10 wound therearound is rotatably accommodated in a cartridge case 10B. On the magnetic recording medium 10, servo patterns in an inverted V-shape as servo signals are preliminarily recorded. The reel 32 is configured such that a leading end of the magnetic recording medium 10 drawn out from the magnetic recording cartridge 10A can be fixed thereto.

The spindle driving device 33 is a device for rotationally driving the spindle 31. The reel driving device 34 is a device for rotationally driving the reel 32. At the time of recording or reproduction of data on the magnetic recording medium 10, the spindle driving device 33 and the reel driving device 34 rotationally drive the spindle 31 and the reel 32, thereby causing the magnetic recording medium 10 to travel. The guide rollers 35 are rollers for guiding the traveling of the magnetic recording medium 10.

The head unit 36 includes a plurality of recording heads for recording data signals on the magnetic recording medium 10, a plurality of reproduction heads for reproducing the data signals recorded on the magnetic recording medium 10, and a plurality of servo heads for reproducing servo signals recorded on the magnetic recording medium 10. As the recording head, there can be used, for example, a ring-type head, but the kind of the recording head is not limited to this.

The communication I/F 37 is for communication with the information processing apparatuses such as the server 41 and the PC 42, and is connected to the network 43.

The controller 38 controls the whole part of the recording/reproduction apparatus 30. For example, the controller 38 causes data signals supplied from the information processing apparatus such as the server 41 and the PC 42 to be recorded on the magnetic recording medium 10 by the head unit 36, according to a demand from the information processing apparatus. In addition, the controller 38 causes the data signals recorded on the magnetic recording medium 10 to be reproduced by the head unit 36 and supplied to the information processing apparatus such as the server 41 and the PC 42, according to a demand from the information processing apparatus.

[Operation of Recording/Reproduction Apparatus]

Next, an operation of the recording/reproduction apparatus 30 having the above-mentioned configuration will be described.

First, the magnetic recording cartridge 10A is mounted to the recording/reproduction apparatus 30, a leading end of the magnetic recording medium 10 is drawn out, is transferred to the reel 32 through the plurality of guide rollers 35 and the head unit 36, and the leading end of the magnetic recording medium 10 is attached to the reel 32.

Next, with an operation section, not illustrated, operated, the spindle driving device 33 and the reel driving device 34 are driven by control of the controller 38, and spindle 31 and the reel 32 are rotated in the same direction, such that the magnetic recording medium 10 travels from the reel 10C toward the reel 32. As a result, while the magnetic recording medium 10 is being taken up around the reel 32, recording of information on the magnetic recording medium 10 or reproduction of information recorded on the magnetic recording medium 10 is performed by the head unit 36.

In addition, in the case of rewinding the magnetic recording medium 10 back onto the reel 10C, the spindle 31 and the reel 32 are driven to rotate in the direction opposite to the above-mentioned direction, whereby the magnetic recording medium 10 is made to travel from the reel 32 to the reel 10C. Also in the instance of this rewinding, recording of information on the magnetic recording medium 10 or reproduction of information recorded on the magnetic recording medium 10 is performed by the head unit 36.

(4) Cartridge

[Configuration of Cartridge]

The present disclosure also provides a magnetic recording cartridge (referred to also as tape cartridge) including the magnetic recording medium according to the present disclosure. In the magnetic recording cartridge, the magnetic recording medium may be wound around, for example, a reel or reels. The magnetic recording cartridge may include, for example, a communication section for communication with the recording/reproduction apparatus, a storage section, and a control section that stores information received from the recording/reproduction apparatus through the communication section into the storage section and that reads out information from the storage section and transmits the information to the recording/reproduction apparatus via the communication section, according to a demand from the recording/reproduction apparatus. The information may include adjustment information for adjusting a tension exerted in the longitudinal direction of the magnetic recording medium. The adjustment information may include, for example, width-direction size information at a plurality of positions in the longitudinal direction of the magnetic recording medium. The width-direction size information may be size information upon the manufacture (at an initial stage upon the manufacture) of the magnetic recording medium which will be described in "Configuration of Cartridge Memory" below, and/or size information acquired in a recording and/or reproduction process of the magnetic recording medium.

Figure 9:
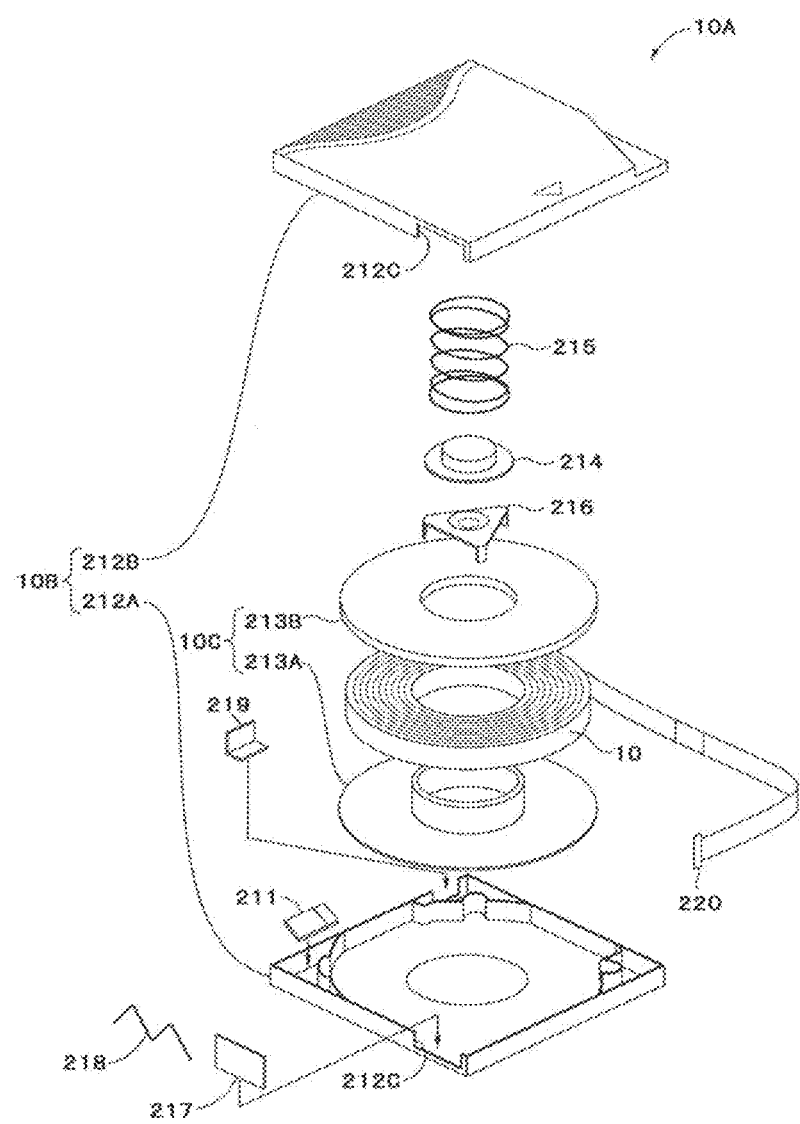
FIG. 9 is an exploded perspective view depicting an example of the configuration of a cartridge.

Referring to FIG. 9, an example of the configuration of the cartridge 10A including the magnetic recording medium 10 having the aforementioned configuration will be described.

FIG. 9 is an exploded perspective view depicting an example of the configuration of the cartridge 10A. The cartridge 10A is a magnetic recording cartridge according to the LTO (Linear Tape Open) standard. The cartridge 10A includes, inside a cartridge case 10B including a lower shell 212A and an upper shell 212B: a reel 10C around which a magnetic tape (tape-shaped magnetic recording medium) 10 is wound; a reel lock 214 and a reel spring 215 for locking rotation of the reel 10C; a spider 216 for canceling the locked state of the reel 10C; a slide door 217 that opens and closes a tape draw-out port 212C provided in the cartridge case 10B ranging over the lower shell 212A and the upper shell 212B; a door spring 218 that energizes the slide door 217 to a closed position of the tape draw-out port 212C; a write protect 219 for preventing erroneous erasure; and a cartridge memory 211. The reel 10C has a substantially disk-like shape having an opening in its central portion, and includes a reel hub 213A and a flange 213B formed of a rigid material such as plastic. A leader pin 220 is provided at one end portion of the magnetic tape 10.

The cartridge memory 211 is provided in the vicinity of one corner portion of the cartridge 10A. In a state in which the cartridge 10 is loaded in the recording/reproduction apparatus 30, the cartridge memory 211 faces a reader-writer (not illustrated) of the recording/reproduction apparatus 30. The cartridge memory 211 performs communication with the recording/reproduction apparatus 30, specifically, with the reader-writer (not illustrated) by a wireless communication standard according to the LTO standard.

[Configuration of Cartridge Memory]

Figure 10:
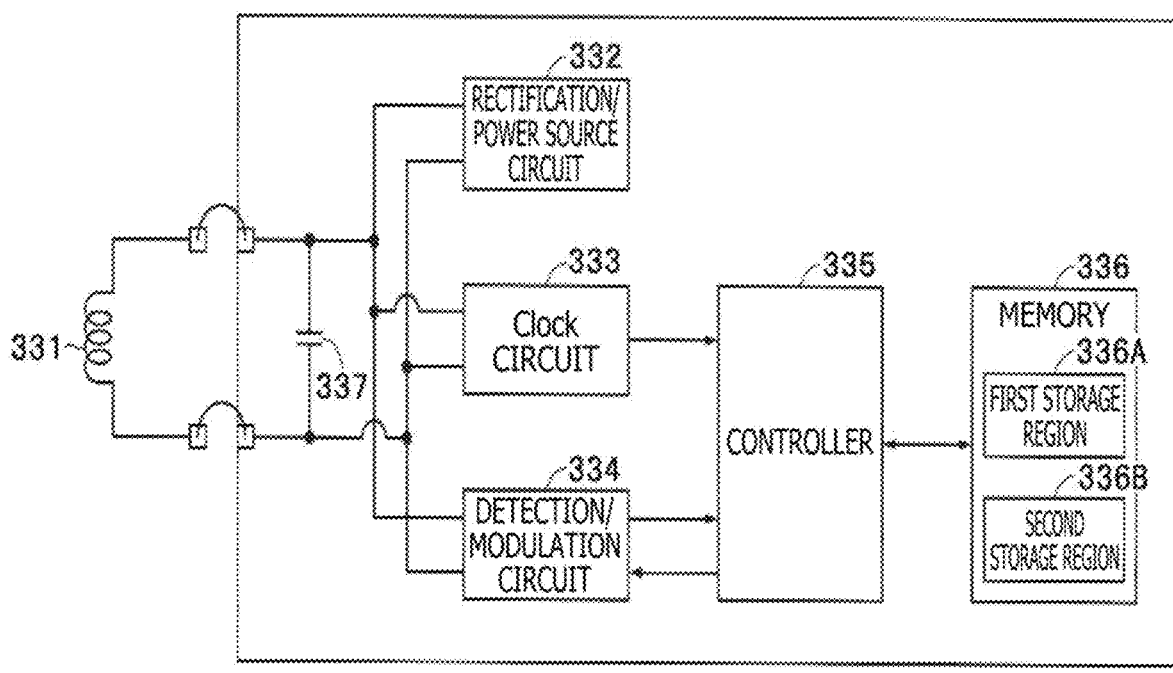
FIG. 10 is a block diagram depicting an example of the configuration of a cartridge memory.

Referring to FIG. 10, an example of the configuration of the cartridge memory 211 will be described.

FIG. 10 is a block diagram depicting an example of the configuration of the cartridge memory 211. The cartridge memory 211 includes: an antenna coil (communication section) 331 for communication with the reader-writer (not illustrated) by a prescribed communication standard; a rectification/power source circuit 332 that generates electric power from an electric wave received from the antenna coil 331 by use of an induced electromotive force, and rectifies the electric power to generate a power source; a clock circuit 333 that generates a clock from the electric wave received from the antenna coil 331 by similarly using an induced electromotive force; a detection/modulation circuit 334 that performs detection of the electric wave received from the antenna coil 331 and modulation of a signal to be transmitted from the antenna coil 331; a controller (control section) 335 including a logical circuit or the like for discriminating commands and data from a digital signal extracted from the detection/modulation circuit 334 and for processing the commands and data; and a memory (storage section) 336 that stores information. In addition, the cartridge memory 211 includes a capacitor 337 connected in parallel to the antenna coil 331, and the antenna coil 331 and the capacitor 337 constitute a resonance circuit.

The memory 336 stores information concerning the cartridge 10A and the like. The memory 336 is a non-volatile memory (NVM). The storage capacity of the memory 336 is preferably equal to or more than approximately 32 KB. For example, in the case where the cartridge 10A is according to the LTO-9 standard or the LTO-10 standard, the memory 336 has a storage capacity of approximately 32 KB.

The memory 336 has a first storage region 336A and a second storage region 336B. The first storage region 336A corresponds to a storage region of a cartridge memory of LTO standards before the LTO8 standard (hereinafter referred to as a "conventional cartridge memory"), and is a region for storing information according to the LTO standards before the LTO8 standard. The information according to the LTO standards before the LTO8 standard is, for example, manufacturing information (for example, specific number of the cartridge 10A or the like), use history (for example, the number of times of tape draw-out (Thread Count), or the like), and the like.

The second storage region 336B corresponds to an extension storage region in regard of the storage region of the conventional cartridge memory. The second storage region 336B is a region for storing additive information. Here, the additive information means information concerning the cartridge 10A that is not prescribed in the LTO standards before the LTO8 standard. Examples of the additive information include tension adjustment information, management ledger data, Index information, or thumb nail information of moving images stored in the magnetic tape 10, but these pieces of data are not limitative. The tension adjustment information includes the distance between adjacent servo bands (the distance between the servo patterns recorded in the adjacent servo bands) at the time of data recording on the magnetic tape 10. The distance between the adjacent servo bands is an example of width concerning information which concerns with the width of the magnetic tape 10. The distance between the servo bands will be described in detail later. In the following description, the information stored in the first storage region 336A may be referred to as "first information," and the information stored in the second storage region 336B may be referred to as "second information."

The memory 336 may have a plurality of banks. In this case, some banks of the plurality of banks may constitute the first storage region 336A, and the remaining banks may constitute the second storage region 336B. Specifically, for example, in the case where the cartridge 10A is according to the LTO-9 standard or the LTO-10 standard, the memory 336 may have two banks having a storage capacity of approximately 16 KB, one of the two banks may constitute the first storage region 336A, and the other bank may constitute the second storage region 336B.

The antenna coil 331 includes an induced voltage by electromagnetic induction. The controller 335 performs communication with the recording/reproduction apparatus 30 by a prescribed communication standard through the antenna coil 331. Specifically, for example, the controller 335 and the recording/reproduction apparatus 30 perform mutual authentication, command transmission/reception, or data transfer, or the like.

The controller 335 stores information received from the recording/reproduction apparatus 30 through the antenna coil 331 into the memory 336. The controller 335 reads out information from the memory 336 and transmits the information to the recording/reproduction apparatus 30 through the antenna coil 331, according to a demand from the recording/reproduction apparatus 30.

(5) Effect

The magnetic recording medium 10 has a configuration in which the average thickness of the magnetic layer 13 is equal to or less than 90 nm, the average aspect ratio of the magnetic powder included in the magnetic layer 13 is from 1.0 to 3.0, the average particle volume of the magnetic powder is equal to or less than 2,300 $nm^3$, the coercive force Hc1 in the perpendicular direction of the magnetic recording medium 10 is equal to or less than 4,500 Oe, the coercive force Hc2 in the longitudinal direction of the magnetic recording medium 10 and the coercive force Hc1 satisfy the relation of Hc2/Hc1≤0.8, and the ratio Hrp/Hc1 of the residual coercive force Hrp of the magnetic recording medium 10 measured by use of a pulsed magnetic field and the coercive force Hc1 is equal to or less than 2.0. With this configuration, the magnetic recording medium 10 is excellent in both electro-magnetic conversion characteristics and thermal stability.

(6) Modifications (Modification 1)

Figure 11:
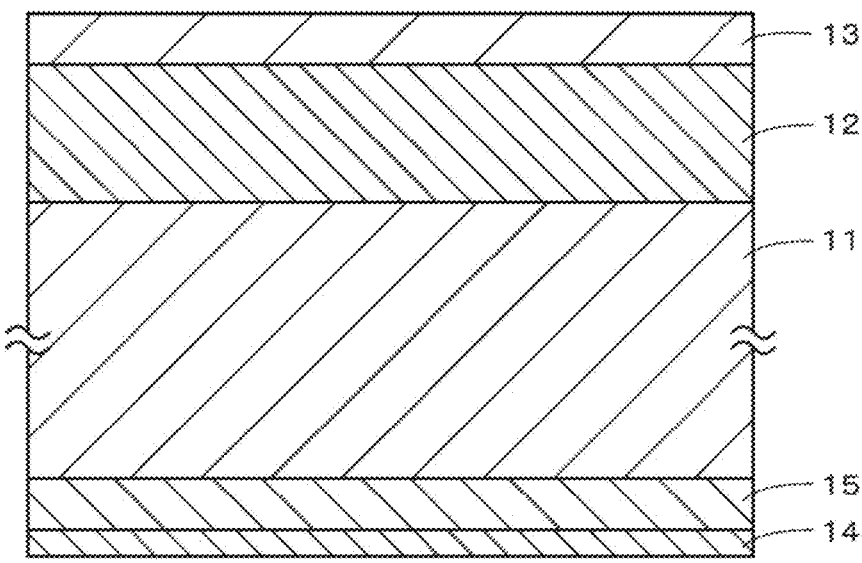
FIG. 11 is a schematic view of a section of a magnetic recording medium in a modification.

As illustrated in FIG. 11, the magnetic recording medium 10 may further include a barrier layer 15 provided on a surface on at least one side of the substrate 11. The barrier layer 15 is a layer for restraining dimensional changes according to the environment possessed by the substrate 11. For example, an example of the causes of the dimensional changes is hygroscopicity of the substrate 11; with the barrier layer 15 provided, a rate of penetration of moisture into the substrate 11 can be lowered. The barrier layer 15 includes, for example, a metal or a metallic oxide. An example of the metal may be at least one kind of metal selected from among Al, Cu, Co, Mg, Si, Ti, V, Cr, Mn, Fe, Ni, Zn, Ga, Ge, Y, Zr, Mo, Ru, Pd, Ag, Ba, Pt, Au and Ta. Examples of the metallic oxide include metallic oxides containing one or two or more of the metals. Specifically, the metallic oxide may be at least one kind of metallic oxide selected from among $Al_2O_3$, CuO, CoO, $SiO_2$, $Cr_2O_3$, $TiO_2$, $Ta_2O_5$, and $ZrO_2$. Besides, the barrier layer 15 may include diamond-like carbon (DLC) or diamond or the like.

The average thickness of the barrier layer 15 is preferably 20 to 1,000 nm, and more preferably 50 to 1,000 nm. The average thickness of the barrier layer 15 is obtained similarly to the average thickness of the magnetic layer 13. It is to be noted, however, that the magnification of the TEM image is adjusted, as required, according to the thickness of the barrier layer 15.

(Modification 2)

The magnetic recording medium 10 may be incorporated in a library apparatus. In other words, the present disclosure also provides a library apparatus that includes at least one magnetic recording medium 10. The library apparatus may have a configuration in which a tension exerted in the longitudinal direction of the magnetic recording medium 10 can be adjusted, and may include a plurality of the above-mentioned recording/reproduction apparatuses 30.

3. Examples

The present disclosure will be specifically described below by way of Examples, but the present disclosure is not limited only to these Examples.

In the present Examples, the average thickness of the base film (substrate), the average thickness of the magnetic layer, the average thickness of the ground layer, the average thickness of the back layer, the average thickness of the magnetic taper (magnetic recording medium), the average aspect ratio of the magnetic powder, the average particle size of the magnetic powder, the average particle volume of the magnetic powder, the coercive force Hc1 of the magnetic tape in the perpendicular direction, the coercive force Hc2 of the magnetic tape in the longitudinal direction, and the residual coercive force Hrp are those obtained by the measuring methods described in the above embodiment.

Example 1

(Preparing Step of Magnetic Layer Forming Coating Material)

A magnetic layer forming coating material was prepared in the manner as follows. First, a first composition of the following formulation was kneaded in an extruder. Next, the kneaded first composition and a second composition of the following formulation were added to a stirring tank equipped with a disperser, and preliminary mixing was conducted. Subsequently, sand mill mixing was further performed, and a filter treatment was conducted, to prepare the magnetic layer forming coating material.

(First Composition)
Magnetic powder: 100 parts by mass
Vinyl chloride resin (cyclohexanone solution 30 mass %): 60 parts by mass
(polymerization degree: 300, Mn=10,000, containing $OSO_3K$=0.07 mmol/g, secondary OH=0.3 mmol/g as polar groups)
Aluminum oxide powder: 5 parts by mass
($\alpha$-$Al_2O_3$, average particle diameter 0.2 μm)
Carbon black: 2 parts by mass
(tradename: Seast TA, produced by Tokai Carbon Co., Ltd.)
Note that, as the magnetic powder, the one described in Table 1 was used.

(Second Composition)
Vinyl chloride resin: 1.1 parts by mass
(resin solution: resin content 30 mass %, cyclohexanone 70 mass %)
n-Butyl stearate: 2 parts by mass
Methyl ethyl ketone: 121.3 parts by mass
Toluene: 121.3 parts by mass
Cyclohexanone: 60.7 parts by mass Finally, 4 parts by mass of polyisocyanate (tradename: Coronate-L, produced by Nippon Polyurethane Industry Co., Ltd.) and 2 parts by mass of myristic acid were added as curing agent to the magnetic layer forming coating material prepared as described above.

(Preparing Step of Ground Layer Forming Coating Material)

A ground layer forming coating material was prepared in the manner as follows. First, a third composition of the following formulation was kneaded in an extruder. The kneaded third composition and a fourth composition of the following formulation were added to a stirring tank equipped with a disperser, and preliminarily mixing was conducted. Subsequently, sand mill mixing was further conducted, and a filter treatment was performed, to prepare the ground layer forming coating material.

(Third Composition)
Acicular iron oxide powder: 100 parts by mass
($\alpha$-$Fe_2O_3$, average long-axis length 0.15 μm)
Vinyl chloride resin: 55.6 parts by mass
(resin solution: resin content 30 mass %, cyclohexanone 70 mass %)
Carbon black: 10 parts by mass
(average particle diameter 20 nm)

(Fourth Composition)
Polyurethane resin UR8200 (produced by Toyobo Co., Ltd.): 18.5 parts by mass
n-Butyl stearate: 2 parts by mass
Methyl ethyl ketone: 108.2 parts by mass
Toluene: 108.2 parts by mass
Cyclohexanone: 18.5 parts by mass Finally, 4 parts by mass of polyisocyanate (tradename: Coronate-L, produced by Tosoh Corporation) and 2 parts by mass of myristic acid were added as curing agent to the ground layer forming coating material prepared as described above.

(Preparing Step of Back Layer Forming Coating Material)

A back layer forming coating material was prepared in the manner as follows. The following raw materials were mixed in a stirring tank equipped with a disperser, and a filter treatment was conducted, to prepare the back layer forming coating material.

Carbon black (tradename: #80, produced by Asahi Carbon Co., Ltd.): 100 parts by mass
Polyester polyurethane: 100 parts by mass
(tradename: N-2304, produced by Nippon Polyurethane Industry Co., Ltd.)
Methyl ethyl ketone: 500 parts by mass
Toluene: 400 parts by mass
Cyclohexanone: 100 parts by mass (Film Forming Step)

Using the coating material prepared in the aforementioned manner, a magnetic tape of a medium configuration 1 set forth in Table 2 below was produced in the manner as follows. First, a long PEN film (base film) having an average thickness of 4.0 μm was prepared as a support. Next, the ground layer forming coating material was applied to a main surface on one side of the PEN film, and was dried, to form a ground layer having an average thickness of 1.1 μm on the main surface on one side of the PEN film. Subsequently, the magnetic layer forming coating material was applied onto the ground layer, and was dried, to form a magnetic layer having an average thickness of 80 nm on the ground layer. Note that at the time of drying the magnetic layer forming coating material, the magnetic powder was subjected to magnetic field orientation in the thickness direction of the PEN film by use of a solenoid coil. Specifically, by using a solenoid coil, the magnetic powder was once subjected to magnetic field orientation in the traveling direction (longitudinal direction) of the PEN film, and thereafter the magnetic powder was subjected to magnetic field orientation in the thickness direction of the PEN film. In addition, by adjusting the drying conditions (drying temperature and drying time) of the magnetic layer forming coating material, the coercive force Hc1 in the perpendicular direction and the coercive force Hc2 in the longitudinal direction were set as set forth in Table 1.

Subsequently, the back layer forming coating material was applied to a main surface on the other side of the PEN film formed with the ground layer and the magnetic layer, and was dried, to form a back layer having an average thickness of 0.4 μm. Then, the PEN film formed with the ground layer, the magnetic layer and the back layer was subjected to a curing treatment. Thereafter, a calender treatment was conducted, to smoothen the surface of the magnetic layer.

(Cutting Step)

The magnetic tape obtained in the aforementioned manner was cut to a width of ½ inch (12.65 mm). As a result, a long magnetic tape having an average thickness of 5.6 μm was obtained. The residual coercive force Hrp of the magnetic tape thus obtained was measured, to be 5,000 Oe.

(Writing of Servo Signals and Data Signals)

Servo signals and data signals were written on the long magnetic tape obtained as described above, in the manner as follows. First, using a servo writer, servo signals were written on the magnetic tape, to form five servo bands having a servo band width $W_{SB}$ of 96 μm. Note that, by the writing of the servo signals, each servo band was formed with a row of magnetic patterns in an inverted V-shape.

Next, using the recording/reproduction apparatus, data signals were written in the data bands between the servo bands. In this instance, the recording/reproduction apparatus was controlled such that the recording track width W was 2.9 μm and the recording wavelength λ was a single recording wavelength of 0.208 μm. Note that the recording wavelength λ [nm] of the data signals was four times the minimum value L [nm] (=0.052 μm) of the distance between magnetization reversals upon recording with a shortest recording wavelength (in other words, the shortest recording wavelength L'=2×L, the recording wavelength λ=(two times of L')). As the recording head, a ring head with a gap length of 0.2 μm was used.

Here, the recording wavelength λ is set to be two times the shortest recording wavelength L', for the following reason. In a recording/reproduction system using a short wavelength, an output/noise ratio at the time of recording/reproduction with a recording wavelength of two times the shortest recording wavelength is often used generally as C/N. In addition, C/N with a recording wavelength of two times the shortest recording wavelength is higher in correlation with error rate than C/N with the shortest recording wavelength. Further, in the case where C/N measurement is conducted at the shortest recording wavelength, tape noise would be hidden behind the system noise of the recording/reproduction system, and noise characteristics of the media may not be properly reflected, depending on the wavelength characteristics of the recording/reproduction system. Particularly in the case of high linear recording density recording, noise characteristics of the media are often not reflected properly.

Figure 12:
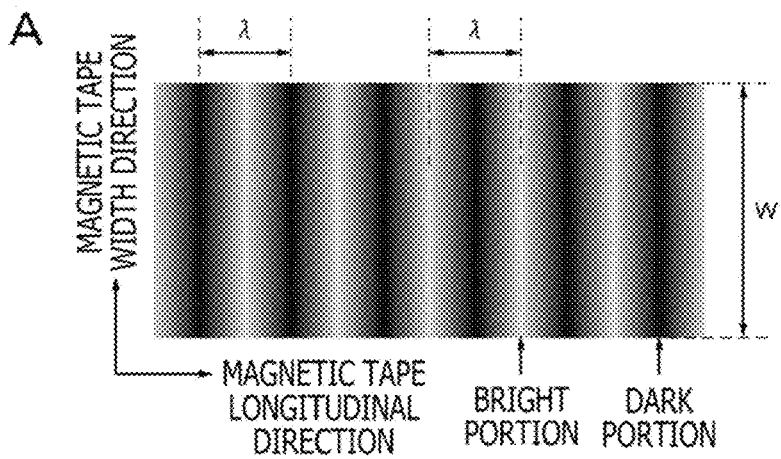
FIG. 12A depicts an MFM image in the case where a data signal is recorded with a wavelength λ.
FIG. 12B depicts an MFM image in the case where a data signal is recorded with a shortest recording wavelength L'.
Figure 12:
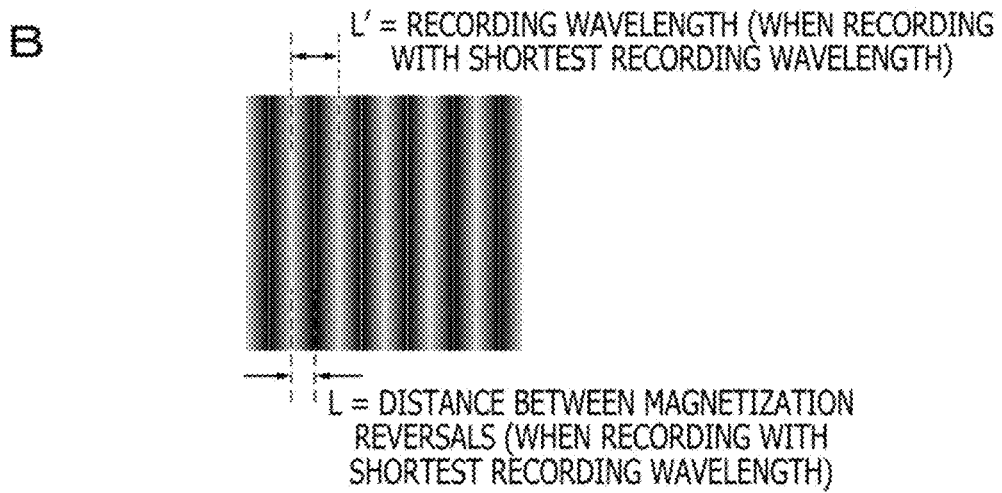

The minimum value L of the distance between magnetization reversals and the data track width W were obtained in the manner as follows. First, the surface of the magnetic layer 13 was observed using a magnetic force microscope (MFM), to acquire an MFM image. Examples of the MFM image are depicted in A and B of FIG. 12. Next, from the MFM image thus acquired, the dimension of a magnetization pattern row in the width direction of the magnetic tape was measured, as a track width W [nm]. In addition, the distance between a bright portion and a bright portion or the distance between a dark portion and a dark portion in the longitudinal direction of the magnetic tape was obtained as λ [nm]. Thereafter, one half of λ [nm] was obtained as L' [nm], and, further, one half of L' [nm] was obtained as L [nm].

Examples 2 to 7

Magnetic tapes were obtained by the same method as in Example 1, except that the magnetic powder was changed to magnetic powders having the average aspect ratios, the average particle sizes and average particle volumes as set forth in Table 1 and that the average thickness, Hc1, Hc2 and Hrp of the magnetic layer were changed as set forth in Table 1.

Example 8

A magnetic tape was obtained by the same method as in Example 4, except that the medium configuration of the magnetic tape was changed to medium configuration 2 in Table 2 and that the average thickness of the magnetic layer was changed to 80 nm. The magnetic tape thus obtained had an Hrp of 4,920 Oe.

Example 9

A magnetic tape was obtained by the same method as in Example 2, except that the medium configuration of the magnetic tape was changed to medium configuration 3 in Table 2.

Example 10

A magnetic tape was obtained by the same method as in Example 6, except that the medium configuration of the magnetic tape was changed to medium configuration 4 in Table 2.

Example 11

A magnetic tape was obtained by the same method as in Example 6, except that the medium configuration of the magnetic tape was changed to medium configuration 5 in Table 2 and that the average thickness of the ground layer was changed to 1.0 μm.

Example 12

A magnetic tape was obtained by the same method as in Example 7, except that the medium configuration of the magnetic tape was changed to medium configuration 6 in Table 2 and that the average thickness of the ground layer was changed to 1.0 μm.

Example 13

A magnetic tape was obtained by the same method as in Example 4, except that Hc1, Hc2 and Hrp were changed as set forth in Table 1.

Example 14

A magnetic tape was obtained by the same method as in Example 4, except that the average thickness of the magnetic layer was changed to 80 nm and that Hc1, Hc2 and Hrp were changed as set forth in Table 1.

Example 15

A magnetic tape was obtained by the same method as in Example 7, except that Hc1, Hc2 and Hrp were changed as set forth in Table 1.

Example 16

A magnetic tape was obtained by the same method as in Example 1, except that the magnetic powder was changed to epsilon iron oxide having the average aspect ratio, the average particle size and the average particle volume as set forth in Table 1 and that Hc1, Hc2 and Hrp were changed as set forth in Table 1.

Example 17

A magnetic tape was obtained by the same method as in Example 1, except that the magnetic powder was changed to epsilon iron oxide having the average aspect ratio, the average particle size and the average particle volume as set forth in Table 1 and that Hc1, Hc2 and Hrp were changed as set forth in Table 1.

Comparative Example 1

A magnetic tape was obtained by the same method as in Example 1, except that the magnetic powder was changed to a magnetic powder having the average aspect ratio, the average particle size and the average particle volume as set forth in Table 1 and that the average thickness, Hc1 and Hrp of the magnetic layer were changed as set forth in Table 1.

Comparative Example 2

A magnetic tape was obtained by the same method as in Example 4, except that the average thickness of the magnetic layer was changed as set forth in Table 1.

Comparative Example 3

A magnetic tape was obtained by the same method as in Example 1, except that the average thickness, Hc1, Hc2 and Hrp of the magnetic layer were changed as set forth in Table 1.

Comparative Example 4

A magnetic tape was obtained by the same method as in Example 1, except that Hc1, Hc2 and Hrp were changed as set forth in Table 1.

Comparative Example 5

A magnetic tape was obtained by the same method as in Example 5, except that Hc1, Hc2 and Hrp were changed as set forth in Table 1.

Comparative Example 6

A magnetic tape was obtained by the same method as in Example 1, except that the magnetic powder was changed to a magnetic powder having the average aspect ratio, the average particle size and the average particle volume as set forth in Table 1 and that the average thickness, Hc1 and Hrp of the magnetic layer were changed as set forth in Table 1.

For the magnetic tapes of Examples 1 to 15 and Comparative Examples 1 to 6 obtained as described above, signal attenuation quantity after the lapse of 10 years and electromagnetic conversion characteristics (C/N) were evaluated. The evaluating methods will be described below.

(Signal Attenuation Quantity after Lapse of 10 Years)

For the samples of Examples and Comparative Examples, signal attenuation quantity after the lapse of 10 years was obtained in the manner as follows. Specifically, "Tape Head Tester (hereinafter referred to as THT)" produced by MicroPhysics, Inc. was used. As the recording/reproduction head, the one mounted on a tape drive "TS1140" produced by IBM Corporation was used as it was. At the time of measurement, the magnetic tape as a magnetic recording medium was cut to a length of 90 cm, was turned into a ring-like shape with the recording layer of the magnetic tape on the back side, and both ends of the magnetic tape were joined to each other on the back side of the magnetic tape using an adhesive tape. In addition, adjacent to the joined portion of the magnetic tape, a silver tape for detection of a tape circulating position was adhered. The ring-shaped magnetic tape was mounted to the THT, and was thereafter circulated at a speed of 2 m/sec.

Next, a signal of 10 MHz generated by a signal generator "ARBITRARY WAVEFORM GENERATOR AWG2021" produced by Tektronix, Inc. was recorded on the magnetic tape over one circulation of the whole length of the tape by use of an optimum recording current. Subsequent to the recording, from the next circulation on, the signal recorded on the tape was continuously reproduced, and the reproduction output was measured by a spectrum analyzer "8591E" produced by Hewlett-Packard. Note that the settings of the spectrum analyzer in this instance were RBW: 1 MHz, VBW: 1 MHz, SWP: 500 msec, point: 400, zero span mode. The measurement was conducted for only 0.4 sec for a portion of only a "recording section" exclusive of the "vicinity of the tape joining portion" where sufficient recording was not performed, and an average value Y of the reproduction output in this period was calculated. The measurement was performed on the basis of each circulation of the tape, and the average value Y of the reproduction outputs in the respective circulations was made to be a reproduction output average Y(t) in the time elapsed from the signal recording end time (t=0). The measurement was performed until t=100 sec, and the measurements were transmitted at suitable time to a personal computer connected, and were recorded.

The aforementioned measurement flow was conducted four times using the same magnetic tape, and the Y(t) values obtained in each measurement were averaged on the basis of the same elapsed time t, to obtain a sequence of $Y_{ave}(t)$. With the elapsed time t taken on an X axis, the $Y_{ave}(t)$ obtained was taken on a Y axis to plot a graph, and an approximate curve was produced from the graph by use of log approximation. Using the approximate curve thus obtained, signal attenuation quantity after 10 years was calculated.

(C/N)

The "Tape Head Tester (hereinafter referred to as THT)" produced by MicroPhysics, Inc. was used. As the recording/reproduction head, a recording/reproduction head mounted on a tape drive "TS1140" produced by IBM Corporation was used as it was. At the time of measurement, the magnetic tape as a magnetic recording medium was cut to a length of 90 cm, was turned into a ring-like shape with the recording layer of the magnetic tape on the back side, and both ends of the magnetic tape were joined to each other on the back side of the magnetic tape by use of an adhesive tape. In addition, adjacent to the joined portion of the magnetic tape, a silver tape for detection of a tape circulating position was adhered. The ring-shaped magnetic tape was mounted to the THT, and was thereafter circulated at a speed of 2 m/sec.

First, a reproduction signal of the magnetic tape was acquired. The acquisition conditions of the reproduction signal are set forth below.

Signal: single recording frequency (10 MHz)

Recording current: optimum recording current

Next, the reproduction signal was taken in by a spectrum analyzer, then, a reproduction output value at 10 MHz and an average value of noise at 10 MHz±1 MHz were measured, and the difference therebetween was made to be C/N. The results were set forth in Table 1 in relative values, with the C/N of Comparative Example 1 taken as 0 dB. Note that, when the C/N is equal to or more than 1.5 dB, media which can be used under short-wavelength narrow-track-density conditions can be realized.

Magnetic characteristics and evaluation results of the magnetic tapes of Examples 1 to 15 and Comparative Examples 1 to 6 are set forth in Table 1 below. Details of medium configurations are set forth in Table 2 below.

TABLE 1

| | Magnetic powder | | | | | Tape | | |
|---|---|---|---|---|---|---|---|---|
| | Composition | Particle shape | Average aspect ratio | Average particle size [nm] | Average particle volume [nm$^3$] | Medium configuration | Average thickness of ground layer [μm] | Average thickness of magnetic layer [nm] |
| Example 1 | BaFe$_{12}$O$_{19}$ | plate-like | 2.8 | 20.3 | 1950 | 1 | 1.1 | 80 |
| Example 2 | BaFe$_{12}$O$_{19}$ | plate-like | 2.6 | 18.6 | 1600 | 1 | 1.1 | 60 |
| Example 3 | BaFe$_{12}$O$_{19}$ | plate-like | 3 | 21.3 | 2100 | 1 | 1.1 | 80 |
| Example 4 | BaFe$_{12}$O$_{19}$ | plate-like | 2.8 | 20.3 | 1950 | 1 | 1.1 | 90 |
| Example 5 | BaFe$_{12}$O$_{19}$ | plate-like | 2.9 | 20.9 | 2050 | 1 | 1.1 | 80 |
| Example 6 | BaFe$_{12}$O$_{19}$ | plate-like | 2.3 | 17.0 | 1400 | 1 | 1.1 | 60 |
| Example 7 | BaFe$_{12}$O$_{19}$ | plate-like | 2 | 15.0 | 1100 | 1 | 1.1 | 60 |
| Example 8 | BaFe$_{12}$O$_{19}$ | plate-like | 2.8 | 20.3 | 1950 | 2 | 1.1 | 80 |
| Example 9 | BaFe$_{12}$O$_{19}$ | plate-like | 2.6 | 18.6 | 1600 | 3 | 1.1 | 60 |
| Example 10 | BaFe$_{12}$O$_{19}$ | plate-like | 2.3 | 17.0 | 1400 | 4 | 1.1 | 60 |
| Example 11 | BaFe$_{12}$O$_{19}$ | plate-like | 2.3 | 17.0 | 1400 | 5 | 1.0 | 60 |
| Example 12 | BaFe$_{12}$O$_{19}$ | plate-like | 2 | 15.0 | 1100 | 6 | 1.0 | 60 |
| Example 13 | BaFe$_{12}$O$_{19}$ | plate-like | 2.8 | 20.3 | 1950 | 1 | 1.1 | 90 |
| Example 14 | BaFe$_{12}$O$_{19}$ | plate-like | 2.8 | 20.3 | 1950 | 1 | 1.1 | 80 |
| Example 15 | BaFe$_{12}$O$_{19}$ | plate-like | 2 | 15.0 | 1100 | 1 | 1.1 | 60 |
| Example 16 | ε-Fe$_2$O$_3$ | plate-like | 1.3 | 15.7 | 2050 | 1 | 1.1 | 80 |
| Example 17 | ε-Fe$_2$O$_3$ | plate-like | 1.3 | 15.7 | 2050 | 1 | 1.1 | 80 |
| Comparative Example 1 | BaFe$_{12}$O$_{19}$ | plate-like | 3.5 | 23.6 | 2450 | 1 | 1.1 | 85 |
| Comparative Example 2 | BaFe$_{12}$O$_{19}$ | plate-like | 2.8 | 20.3 | 1950 | 1 | 1.1 | 100 |
| Comparative Example 3 | BaFe$_{12}$O$_{19}$ | plate-like | 2.8 | 20.3 | 1950 | 1 | 1.1 | 85 |
| Comparative Example 4 | BaFe$_{12}$O$_{19}$ | plate-like | 3.0 | 21.3 | 2300 | 1 | 1.1 | 80 |
| Comparative Example 5 | BaFe$_{12}$O$_{19}$ | plate-like | 2.9 | 20.9 | 2050 | 1 | 1.1 | 80 |
| Comparative Example 6 | BaFe$_{12}$O$_{19}$ | plate-like | 1.9 | 14.1 | 950 | 1 | 1.1 | 80 |

| | Tape | | | | | | Evaluation results | |
|---|---|---|---|---|---|---|---|---|
| | Average thickness of tape [μm] | Hc1 [Oe] | Hc2 [Oe] | Hc2/Hc1 | Hrp [Oe] | Hrp/Hc1 | Signal attenuation quantity after lapse of 10 years [dB] | C/N [dB] |
| Example 1 | 5.6 | 2750 | 2000 | 0.73 | 5000 | 1.82 | −0.30 | 2.0 |
| Example 2 | 5.6 | 2920 | 1920 | 0.66 | 5100 | 1.75 | −0.21 | 3.8 |
| Example 3 | 5.6 | 2750 | 2000 | 0.73 | 4800 | 1.75 | −0.22 | 1.7 |
| Example 4 | 5.6 | 2750 | 2000 | 0.73 | 5000 | 1.82 | −0.30 | 1.6 |
| Example 5 | 5.6 | 2980 | 2000 | 0.67 | 5000 | 1.68 | −0.10 | 2.6 |
| Example 6 | 5.6 | 2550 | 1820 | 0.71 | 4850 | 1.90 | −0.52 | 3 |
| Example 7 | 5.6 | 2500 | 1840 | 0.74 | 4960 | 1.98 | −0.95 | 3.3 |

TABLE 1-continued

|  | | | | | | | | |
|---|---|---|---|---|---|---|---|---|
| Example 8 | 5.6 | 2750 | 2000 | 0.73 | 4920 | 1.79 | −0.24 | 1.6 |
| Example 9 | 5.2 | 2920 | 1920 | 0.66 | 5100 | 1.75 | −0.20 | 3.3 |
| Example 10 | 5.2 | 2550 | 1820 | 0.71 | 4850 | 1.90 | −0.52 | 2.5 |
| Example 11 | 4.5 | 2550 | 1820 | 0.71 | 4850 | 1.90 | −0.52 | 2 |
| Example 12 | 4.5 | 2500 | 1840 | 0.74 | 4960 | 1.98 | −0.95 | 2.3 |
| Example 13 | 5.6 | 2990 | 1500 | 0.50 | 4880 | 1.63 | −0.08 | 3.0 |
| Example 14 | 5.6 | 2690 | 2150 | 0.80 | 5050 | 1.88 | −0.48 | 1.3 |
| Example 15 | 5.6 | 2980 | 1960 | 0.66 | 5400 | 1.81 | −0.30 | 4.5 |
| Example 16 | 5.6 | 2850 | 2020 | 0.71 | 5400 | 1.89 | −0.50 | 2.1 |
| Example 17 | 5.6 | 4450 | 3200 | 0.72 | 8000 | 1.8 | −0.3 | 1.7 |
| Comparative Example 1 | 5.6 | 2820 | 2000 | 0.71 | 4800 | 1.70 | −0.12 | 0 |
| Comparative Example 2 | 5.6 | 2750 | 2000 | 0.73 | 5000 | 1.82 | −0.30 | 1 |
| Comparative Example 3 | 5.6 | 2500 | 2100 | 0.84 | 4780 | 1.91 | −0.55 | 0.3 |
| Comparative Example 4 | 5.6 | 4550 | 3400 | 0.75 | 8300 | 1.82 | −0.05 | 1.5 |
| Comparative Example 5 | 5.6 | 2100 | 1600 | 0.76 | 4400 | 2.10 | −1.8 | 1.5 |
| Comparative Example 6 | 5.6 | 2300 | 1800 | 0.78 | 5800 | 2.52 | −3 | 1.5 |

TABLE 2

|  | Medium configuration | Average thickness of magnetic tape [μm] | Number of servo tracks | Average thickness of substrate [μm] | W/L | W [μm] | L [μm] |
|---|---|---|---|---|---|---|---|
| Medium configuration 1 | Magnetic layer/ground layer/substrate/back layer | 5.6 | 5 | 4.0 | 50 | 2.9 | 0.052 |
| Medium configuration 2 | Magnetic layer/ground layer/substrate/back layer | 5.6 | 5 | 4.0 | 30 | 1.5 | 0.048 |
| Medium configuration 3 | Magnetic layer/ground layer/substrate/back layer | 5.2 | 5 | 3.6 | 23 | 0.95 | 0.042 |
| Medium configuration 4 | Magnetic layer/ground layer/substrate/back layer | 5.2 | 9 | 3.6 | 13 | 0.51 | 0.039 |
| Medium configuration 5 | Magnetic layer/ground layer/substrate/back layer | 4.5 | 9 | 3.1 | 21 | 0.83 | 0.039 |
| Medium configuration 6 | Magnetic layer/ground layer/substrate/back layer | 4.5 | 9 | 3.1 | 16 | 0.63 | 0.038 |

From Table 1 and Table 2, the followings become clear.

The magnetic tapes of Examples 1 to 15 all have a signal attenuation quantity after the lapse of 10 years of equal to or more than −1.0 dB, notwithstanding the average particle volume of the magnetic powder was equal to or less than 2,300 nm$^3$. Therefore, all the magnetic tapes of Examples 1 to 15 were excellent in thermal stability, notwithstanding the average particle volume of the magnetic powder was small. Further, the magnetic tapes of Examples 1 to 15 all have a C/N of equal to or more than 1.5 dB, and were excellent in electro-magnetic conversion characteristics. From these results, it becomes clear that the magnetic recording medium of the present disclosure is excellent in electro-magnetic conversion characteristics and thermal stability.

From the comparison of Example 3 with Comparative Example 1, it becomes clear that the condition in which the average aspect ratio of the magnetic powder is equal to or less than 3.0 and the average particle volume of the magnetic powder is equal to or less than 2,300 nm$^3$ contributes to a C/N of equal to or more than 1.5 dB.

From the comparison of Example 4 with Comparative Example 2, it becomes clear that the condition in which the average thickness of the magnetic layer is equal to or less than 90 nm contributes a C/N of equal to or more than 1.5 dB.

From the comparison of Example 1 with Comparative Example 3, it becomes clear that the condition in which Hc1 and Hc2 satisfy the relation of Hc2/Hc1≤0.8 contributes to a C/N of equal to or more than 1.5 dB.

From the comparison of Example 1 with Comparative Example 4, it becomes clear that the condition in which Hc1 is equal to or less than 4,500 Oe contributes to a C/N of equal to or more than 1.5 dB.

From these comparisons, it becomes clear that the conditions in which the average aspect ratio of the magnetic powder is equal to or less than 3.0 and the average particle volume is equal to or less than 2,300 nm$^3$, the average thickness of the magnetic layer is equal to or less than 90 nm, Hc2 and Hc1 satisfy the relation of Hc2/Hc1≤0.8, and Hc1 is equal to or less than 4,500 Oe lead to enhancement of electro-magnetic conversion characteristics.

As indicated by Comparative Examples 5 and 6, however, it becomes clear that the signal attenuation quantity after the lapse of 10 years may be lower than −1.0 dB and excellent thermal stability may not be obtained, even if these requirements are satisfied.

Here, from Example 5 and Comparative Example 5, it becomes clear that the condition in which Hrp/Hc1 is equal to or less than 2.0 contributes to lowering in the signal attenuation quantity after the lapse of 10 years, that is, the condition leads to enhancement of thermal stability.

In addition, in other Examples, also, Hrp/Hc1 is equal to or less than 2.0, and in these Examples, the signal attenuation quantity after the lapse of 10 years is equal to or more than −1.0 dB. In Comparative Example 6, Hrp/Hc1 is in excess of 2.0, and the signal attenuation quantity after the lapse of 10 years is lower than −1.0 dB. These results also indicate that the condition in which Hrp/Hc1 is equal to or more than 2.0 leads to enhancement of thermal stability.

From the foregoing, it becomes clear that, where the average aspect ratio and the average particle volume of the magnetic powder, the average thickness of the magnetic layer, the ratio Hc2/Hc1 and Hc1 are within specific numerical value ranges and Hrp/Hc1 is equal to or less than 2.0, it is thereby ensured that the magnetic recording medium is excellent in electro-magnetic conversion characteristics and thermal stability.

In Examples 7 and 12, Hrp/Hc1 is 1.98, and in this case, the signal attenuation quantity after 10 years is −0.95 dB. In contrast, in other Examples, Hrp/Hc1 is lower, and the evaluation results of the signal attenuation quantity after 10 years are better. From these results, in order to further enhance thermal stability, Hrp/Hc1 is preferably equal to or less than 1.95, more preferably equal to or less than 1.90, and particularly preferably equal to or less than 1.85. For example, where Hrp/Hc1 is equal to or less than 1.85, it is thereby ensured that the signal attenuation quantity after 10 years can be equal to or more than −0.50 dB.

Examples 1 to 7 and Examples 13 to 15 and Examples 8 to 12 are different in the medium configuration of the magnetic tape. For example, W/L values of the medium configurations 2 to 6 are smaller than those of the medium configuration 1. In addition, the average thicknesses of the magnetic tapes of medium configurations 3 to 6 are smaller than those of medium configurations 1 and 2. Besides, the number of servo tracks of medium configurations 4 to 6 is more than that of medium configurations 1 to 3.

In regard of the magnetic tapes having thus different medium configurations, also, excellent electro-magnetic conversion characteristics and thermal stability are obtained, as indicated in Examples 1 to 15. Therefore, the effects of the present disclosure are produced in the magnetic tapes having various medium configurations.

While the embodiments and Examples of the present disclosure have been specifically described above, the present disclosure is not limited to the above-mentioned embodiments and Examples, and various modifications based on the technical thought of the present disclosure are possible.

For example, the configurations, methods, steps, shapes, materials, numerical values and the like mentioned in the above-described embodiments and Examples are merely illustrative, and different configurations, methods, steps, shapes, materials, numerical values and the like from those described above may be used, as required. In addition, the chemical formulas of compounds and the like are typical ones, and the general names of the same compound are not limited to the described valence or the like.

Besides, the configurations, methods, steps, shapes, materials, numerical values and the like in the above-described embodiments and Examples may be combined with one another, insofar as the combination does not depart from the gist of the present disclosure.

In addition, the numerical value range indicated using "to" herein indicates a range which includes the numerical values described before and after "to" as a minimum value and a maximum value. In the numerical value ranges described stepwise herein, the upper limit or lower limit of the numerical value range at a certain stage may be replaced by the upper limit or lower limit of the numerical value range at another stage. The materials mentioned as examples herein may be used either singly or in combination of two or more of them, unless specified otherwise.

Note that the present disclosure may take the following configurations.

(1)

A tape-shaped magnetic recording medium, including:
a substrate; and
a magnetic layer provided over the substrate and including a magnetic powder,
in which the magnetic layer has an average thickness of equal to or less than 90 nm,
the magnetic powder has an average aspect ratio of from 1.0 to 3.0,
the magnetic powder has an average particle volume of equal to or less than 2,300 nm$^3$,
a coercive force Hc1 in a vertical direction of the magnetic recording medium is equal to or less than 4,500 Oe,
a coercive force Hc2 in a longitudinal direction of the magnetic recording medium and the coercive force Hc1 satisfy a relation of Hc2/Hc1≤0.8, and
a ratio Hrp/Hc1 of a residual coercive force Hrp of the magnetic recording medium measured using a pulsed magnetic field and the coercive force Hc1 is equal to or less than 2.0.

(2)

The magnetic recording medium according to (1), in which the average particle volume of the magnetic powder is equal to or less than 2,200 nm$^3$.

(3)

The magnetic recording medium according to (1) or (2), in which the ratio Hrp/Hc1 is equal to or less than 1.95.

(4)

The magnetic recording medium according to (1) or (2), in which the ratio Hrp/Hc1 is equal to or less than 1.90.

(5)

The magnetic recording medium according to (1) or (2), in which the ratio Hrp/Hc1 is equal to or less than 1.85.

(6)

The magnetic recording medium according to any one of (1) to (5), in which the magnetic powder includes hexagonal ferrite.

(7)

The magnetic recording medium according to (6), in which the hexagonal ferrite contains at least one kind of metal selected from among Ba and Sr.

(8)

The magnetic recording medium according to any one of (1) to (7), in which the coercive force Hc2 in the longitudinal direction of the magnetic recording medium is equal to or less than 2,000 Oe.

(9)

The magnetic recording medium according to any one of (1) to (8), in which the magnetic recording medium has an average thickness of equal to or less than 5.6 μm.

(10)

The magnetic recording medium according to any one of (1) to (9), in which the substrate has an average thickness of equal to or less than 4.2 μm.

(11)

The magnetic recording medium according to any one of (1) to (10), in which the average thickness of the magnetic layer is equal to or less than 80 nm.

(12)

The magnetic recording medium according to any one of (1) to (11), in which the coercive force Hc2 and the coercive force Hc1 satisfy a relation of Hc2/Hc1≤0.7.

(13)

The magnetic recording medium according to any one of (1) to (12), in which the coercive force Hc1 is equal to or more than 500 Oe.

(14)

The magnetic recording medium according to any one of (1) to (13), in which a ground layer is provided between the magnetic layer and the substrate, and the ground layer has an average thickness of equal to or less than 2.0 μm.

(15)

The magnetic recording medium according to any one of (1) to (14), in which a back layer is provided on a surface on a side opposite to a surface on a side on which the magnetic layer is provided, of two surfaces of the substrate, and the back layer has an average thickness of equal to or less than 0.6 μm.

(16)

The magnetic recording medium according to any one of (1) to (15), in which the average particle size of the magnetic powder is equal to or less than 50 nm.

(17)

A tape cartridge including:

the tape-shaped magnetic recording medium according to any one of (1) to (16);

a communication section that performs communication with a recording/reproduction apparatus;

a storage section; and a control section that stores information received from the recording/reproduction apparatus through the communication section in the storage section, and, in response to demand from the recording/reproduction apparatus, reads the information out of the storage section and transmits the information to the recording/reproduction apparatus through the communication section, in which the information includes adjustment information for adjusting a tension exerted in the longitudinal direction of the magnetic recording medium.

REFERENCE SIGN LIST

10 Magnetic recording medium
11 Substrate (Base layer)
12 Ground layer
13 Magnetic layer
14 Back layer

The invention claimed is:

1. A tape-shaped magnetic recording medium, comprising:

a substrate; and a magnetic layer provided over the substrate and including a magnetic powder, wherein the magnetic layer has an average thickness of equal to or less than 90 nm, the magnetic powder has an average aspect ratio of from 1.0 to 3.0, the magnetic powder has an average particle volume of equal to or less than 2,300 nm$^3$, a coercive force Hc1 in a vertical direction of the magnetic recording medium is equal to or less than 4,500 Oe, a coercive force Hc2 in a longitudinal direction of the magnetic recording medium and the coercive force Hc1 satisfy a relation of Hc2/Hc1≤0.8, and a ratio Hrp/Hc1 of a residual coercive force Hrp of the magnetic recording medium measured using a pulsed magnetic field and the coercive force Hc1 is equal to or less than 2.0.

2. The magnetic recording medium according to claim 1, wherein the average particle volume of the magnetic powder is equal to or less than 2,200 nm$^3$.

3. The magnetic recording medium according to claim 1, wherein the ratio Hrp/Hc1 is equal to or less than 1.95.

4. The magnetic recording medium according to claim 1, wherein the ratio Hrp/Hc1 is equal to or less than 1.90.

5. The magnetic recording medium according to claim 1, wherein the ratio Hrp/Hc1 is equal to or less than 1.85.

6. The magnetic recording medium according to claim 1, wherein the magnetic powder includes hexagonal ferrite.

7. The magnetic recording medium according to claim 6, wherein the hexagonal ferrite contains at least one kind of metal selected from among Ba and Sr.

8. The magnetic recording medium according to claim 1, wherein the coercive force Hc2 in the longitudinal direction of the magnetic recording medium is equal to or less than 2,000 Oe.

9. The magnetic recording medium according to claim 1, wherein the magnetic recording medium has an average thickness of equal to or less than 5.6 μm.

10. The magnetic recording medium according to claim 1, wherein the substrate has an average thickness of equal to or less than 4.2 μm.

11. The magnetic recording medium according to claim 1, wherein the average thickness of the magnetic layer is equal to or less than 80 nm.

12. The magnetic recording medium according to claim 1, wherein the coercive force Hc2 and the coercive force Hc1 satisfy a relation of Hc2/Hc1≤0.7.

13. The magnetic recording medium according to claim 1, wherein the coercive force Hc1 is equal to or more than 500 Oe.

14. The magnetic recording medium according to claim 1, wherein a ground layer is provided between the magnetic layer and the substrate, and the ground layer has an average thickness of equal to or less than 2.0 μm.

15. The magnetic recording medium according to claim 1, wherein a back layer is provided on a surface on a side opposite to a surface on a side on which the magnetic layer is provided, of two surfaces of the substrate, and the back layer has an average thickness of equal to or less than 0.6 μm.

16. The magnetic recording medium according to claim 1, wherein the average particle size of the magnetic powder is equal to or less than 50 nm.

17. A tape cartridge comprising:
the tape-shaped magnetic recording medium according to claim 1;
a communication section that performs communication with a recording/reproduction apparatus;
a storage section; and
a control section that stores information received from the recording/reproduction apparatus through the communication section in the storage section, and, in response to demand from the recording/reproduction apparatus, reads the information out of the storage section and transmits the information to the recording/reproduction apparatus through the communication section,
wherein the information includes adjustment information for adjusting a tension exerted in the longitudinal direction of the magnetic recording medium.

* * * * *